United States Patent [19]

Tanaka et al.

[11] Patent Number: 5,732,297
[45] Date of Patent: Mar. 24, 1998

[54] CAMERA

[75] Inventors: Nobuyuki Tanaka, Hidaka; Yasuo Asakura, Hachioji; Yuji Kobayashi, Hachioji; Masatoshi Sato, Hachioji; Keita Takahashi, Kanagawa, all of Japan

[73] Assignee: Olympus Optical Co., Ltd., Tokyo, Japan

[21] Appl. No.: 498,583

[22] Filed: Jul. 6, 1995

[30] Foreign Application Priority Data

Jul. 7, 1994 [JP] Japan .................. 6-156061
Jul. 19, 1994 [JP] Japan .................. 6-167058
Jul. 22, 1994 [JP] Japan .................. 6-170973

[51] Int. Cl.$^6$ .................. G03B 13/10; G03B 17/00; G03B 17/24
[52] U.S. Cl. .................. 396/380; 396/436; 396/311
[58] Field of Search .................. 354/94, 106, 159, 354/221, 222; 396/377, 378, 380, 435, 436

[56] References Cited

U.S. PATENT DOCUMENTS

| | | | |
|---|---|---|---|
| 4,973,997 | 11/1990 | Harvey | 354/106 |
| 5,150,143 | 9/1992 | Ohno et al. | 354/400 |
| 5,227,824 | 7/1993 | Yoshida et al. | 354/106 |
| 5,583,593 | 12/1996 | Terada | 396/435 |
| 5,592,252 | 1/1997 | Kobayashi et al. | 396/380 |

FOREIGN PATENT DOCUMENTS 1-282531  11/1989  Japan .
6439  1/1993  Japan .

Primary Examiner—Safet Metjahic
Assistant Examiner—John Chizmar
Attorney, Agent, or Firm—Louis Weinstein

[57] ABSTRACT

A camera for setting the aspect ratio of a photographic image plane and recording information of the set aspect ratio has a full-size frame defining a full-size finder image plane corresponding to a photographing image plane, a vertical mask for vertical trimming of the finder image plane, a lateral mask for lateral trimming of the finder image plane, a shaft supporting the masks, and a camshaft with a cam groove engaged by each of the masks. The masks are moved along the shaft by rotating the camshaft. The visual field range of the finder image plane is changed among a plurality of states corresponding to different aspect ratios. The camera finder visual field frame switching mechanism consists of: a vertical mask for vertical trimming, lateral mask for lateral trimming, cam gear having a cam, vertically movable mask operating member, a vertical trimming switch detecting vertical-mask trimming movement, which is aspect ratio information, and a lateral trimming switch detecting lateral-mask trimming movement positional information which is also aspect ratio information. Another embodiment is provided with a vertical mask for vertical trimming of a finder image plane and a lateral mask for lateral trimming of the finder image plane, which, after the vertical mask retreats from a vertical trimming position, moves the lateral mask to a lateral trimming position. After the lateral mask retreats from the lateral trimming position, the vertical mask is moved to the vertical trimming position.

61 Claims, 15 Drawing Sheets

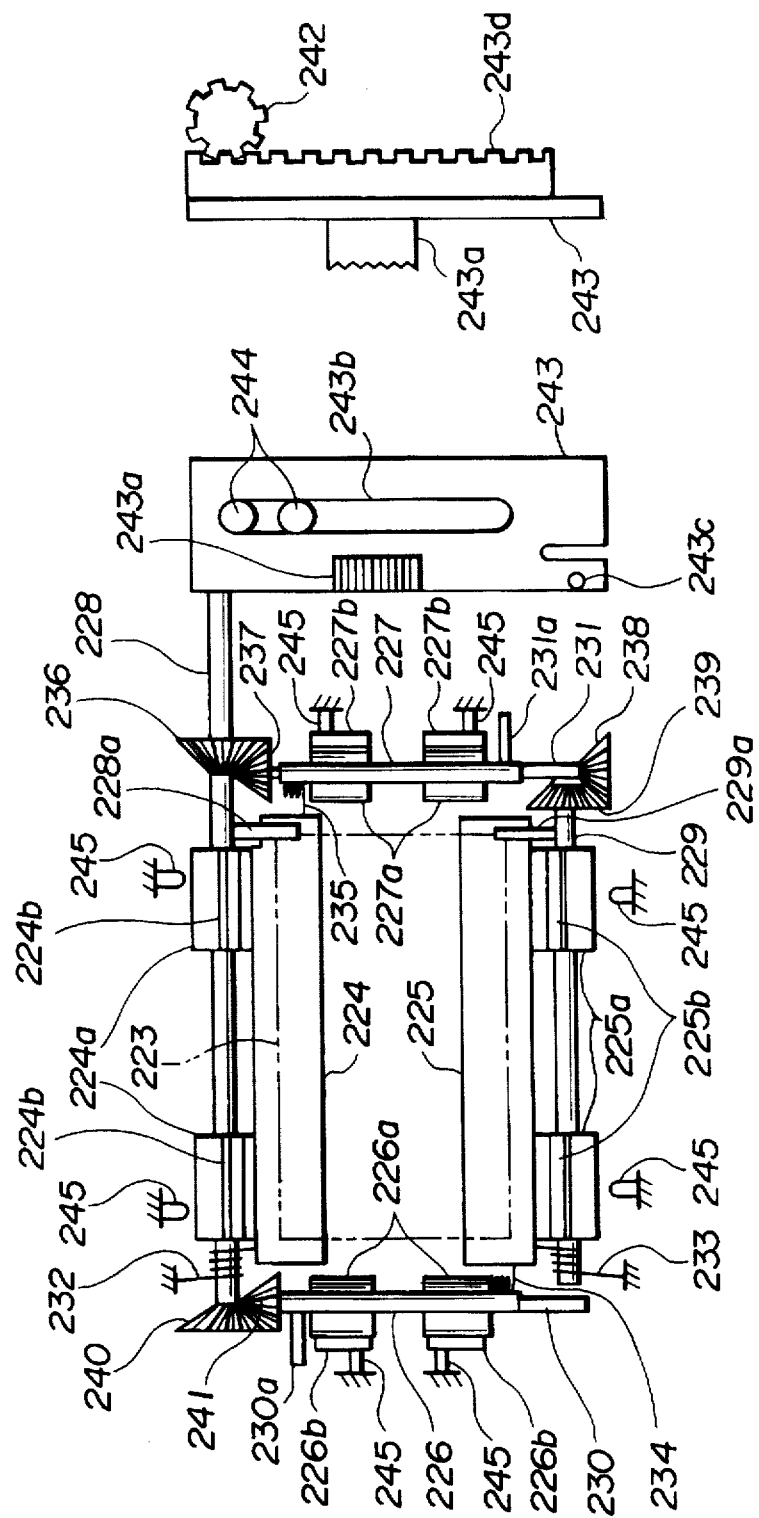

CAMERA

BACKGROUND OF THE INVENTION

1. Field of the Invention

The present invention generally relates to a camera, and more particularly to a camera which can record photographing information, such as trimming information, on a recording medium.

2. Description of the Related Art

Hitherto, there have been proposed various cameras of the type that can set the aspect ratio of a photographic image plane and further can record trimming information, such as information on this set aspect ratio, on a recording medium such as film.

An example of such a type of a camera provided with an aspect-ratio setting means, such as a finder mask or the like, for setting a print aspect ratio and with a recording means, such as a light emitting diode (LED), for recording on a film plane information representing this set aspect ratio is described in, for instance, the Japanese Patent Public Disclosure Official Gazette No. 1-282531/1989.

Further, another example of such a type of a camera, in which means for setting a finder mask having a plurality of frames and means for recording trimming information are provided and in which the finder mask returns to an initial position in response to a photographing operation, is described in the Japanese Utility Model Public Disclosure Official Gazette No. 5-6439/1993.

The cameras described in the Japanese Patent Public Disclosure Official Gazette No. 1-282531/1989 and the Japanese Utility Model Public Disclosure Official Gazette No. 5-6439/1993, however, have drawbacks in that in the case where these cameras employ a plurality of trimming sizes, especially, in the case where the trimming or cropping can be performed on a finder image plane in both of vertical and lateral directions thereof, the finder mask retreats in each of these directions and thus a space required for the finder mask to retreat becomes extremely large. Further, these cameras have another drawback in that, when switching the finder mask, the boundary between masks sometimes passes through a finder visual field (or field of view) and thus the finder may become hard to see.

Moreover, the Japanese Patent Public Disclosure Official Gazette No. 4-233525/1992 describes a camera constituted in such a manner as to be able to change the magnification of a finder in response to an operation of switching a finder visual field frame. This camera incorporates a mechanism for switching a finder visual field frame, which is illustrated in FIG. 30. This mechanism for switching a finder visual field frame switches the size of the visual field frame by moving two visual field masks 316, which are slidably supported between two Porro prisms 315, along two guide pins 315a by pivotally moving a P ring 313.

The camera described in the Japanese Patent Public Disclosure Official Gazette No. 4-233525/1992, however, can not perform a trimming in one of vertical and lateral directions, because the visual field masks 316 move vertically and laterally at the same time in the field of the full-size in the case of switching from the finder visual field frame of a size to that of another size.

OBJECTS AND SUMMARY OF THE INVENTION

Accordingly, a first object of the present invention is to provide a camera which can switch the state of a visual field range on a finder image plane among a plurality of states.

Further, a second object of the present invention is to provide a camera which can switch the state of the aspect ratio of a finder field range on a finder image plane among a plurality of states.

Moreover, a third object of the present invention is to provide a camera which can switch the state of a visual field range on a finder image plane among a plurality of states without striking a user as incongruous.

Furthermore, a fourth object of the present invention is to provide a small size camera in which a space required for the finder mask to retreat is small.

Additionally, a fifth object of the present invention is to provide a small size camera in which the vertical size of a space required for the finder mask to retreat is small.

Besides, a sixth object of the present invention is to provide a small size camera in which the lateral size of a space required for the finder mask to retreat is small.

Briefly, to achieve the foregoing object, in accordance with the present invention, there is provided a camera being capable of setting the aspect ratio of a photographic image plane and further recording information representing this set aspect ratio on a recording medium, which comprises a first mask means for defining an observable finder image plane corresponding to a photographing image plane, a second mask means for performing a vertical trimming on the finder image plane, a third mask means for performing a lateral trimming on the finder image plane and a switching means for switching the state of a visual field range on the finder image plane among a plurality of states respectively corresponding to different aspect ratios by moving the second mask and the third mask in a same direction.

Other features, objects and advantages of the present invention will become apparent from the following description of preferred embodiments with reference to the drawings in which like reference characters designate like or corresponding parts throughout several views.

BRIEF DESCRIPTION OF THE DRAWINGS

FIG. 21 is a front view of a finder visual field frame switching mechanism of a camera which is a fifth embodiment of the present invention;

FIG. 22 is a side view of an operating lever of the finder visual field frame switching mechanism of the camera, namely, the fifth embodiment;

DETAILED DESCRIPTION OF THE PREFERRED EMBODIMENTS

Hereinafter, the preferred embodiments of the present invention will be described in detail by referring to the accompanying drawings.

FIGS. 1 to 10 illustrate a first embodiment of the present invention.

First, the placement of a finder visual field switching mechanism 6 in a single lens reflex camera 1 will be described by referring to FIG. 1.

Figure 1:
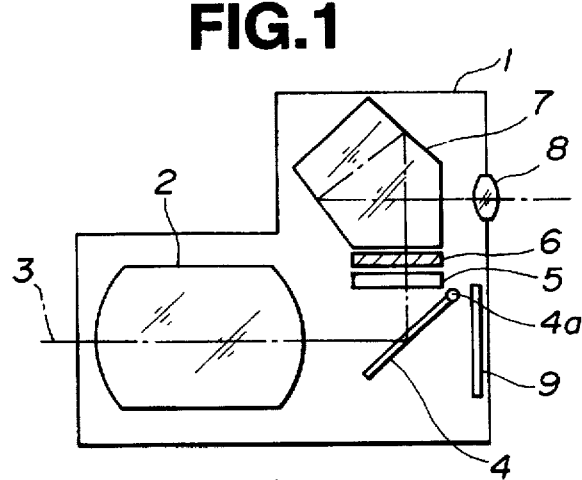
FIG. 1 is a sectional view of a single lens reflex camera, which illustrates the placement of a finder visual field switching mechanism of a first embodiment of the present invention.

FIG. 1 is a schematic vertical section view of the single lens reflex camera 1, taken along the optical axis thereof.

In the single lens reflex camera 1, a photographic lens (namely, a picture-taking lens) 2 serves as an objective lens of a finder optical system. A main mirror 4 is provided between this photographic lens 2 and film 9 in such a manner that the reflecting surface thereof is upwardly inclined at about 45 degrees away from the optical axis of the lens 2 and that the main mirror 4 can rotate around a fulcrum 4a and retreat (namely, come up). Thus, an optical path 3 bends upwardly when mirror 4 is in the position shown in FIG. 1.

A focusing screen (or finder screen) 5 is placed at a position which is optically equivalent to the position of the film 9 with respect to the photographic lens 2. A left-to-right reversal image of a subject is formed on the focusing screen.

Light from this image formed on the focusing screen 5 is brought to an objective lens 8 through a pentaprism 7 which obtains an erect normal image as a result of correcting the reversal. Further, this erect normal image is observed under magnification by a photographer through this objective lens 8.

In such a single lens reflex camera 1, a finder visual field switching mechanism 6 is provided between the focusing screen 5 and the pentaprism 7.

Figure 2:
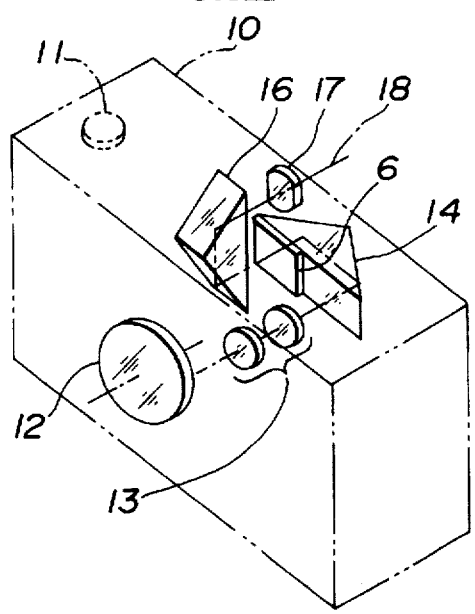
FIG. 2 is a perspective view of a compact camera, which also illustrates the placement of the finder visual field switching mechanism of the first embodiment.

FIG. 2 is a perspective diagram for mainly illustrating an optical system of a compact camera 10.

In the compact camera 10, a release button 11 is provided on the top thereof and a picture-taking lens 12 is placed in an almost central portion thereof.

In the case of this compact camera 10, a finder optical system is provided separately from the picture-taking lens 12. Thus light from an object is incident on a first right-triangular prism 14 through an objective lens 13.

In the case of this first prism 14, both of two reflecting faces intersecting orthogonally with each other are placed on a horizontal plane. Incident light is reflected two times at these reflecting faces and is then emergent to the front thereof. At that time, the image of the object is reversed or flipped from side to side.

The emergent light from the first prism 14 is incident on a second right-triangular prism 16. In the case of this second prism 16, two reflecting faces intersecting orthogonally with each other are placed on a vertical plane. This incident light is reflected two times by these reflecting faces and is then emergent to the rear thereof. At that time, the image of the object is reversed or flipped from top to bottom.

A finder optical axis 18 is bent two times like Japanese kana "コ" by combining the first prism 14 with the second prism 16 in this way. The image of the object is changed into an erect normal image which is observed under magnification through an objective lens 17.

In the case of such a compact camera 10, a finder visual field switching mechanism 6 is provided in the vicinity of the emergent end-face, namely, in the proximity of the focal plane of the first prism 14.

Figure 3:
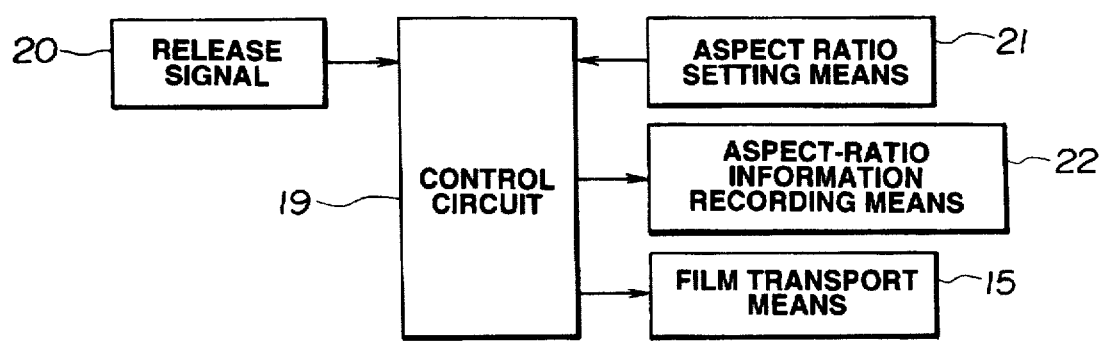
FIG. 3 is a schematic block diagram for showing the configuration of the camera according to the first embodiment.

Next, FIG. 3 is a schematic block diagram for showing the configuration of the camera.

As shown in this figure, an aspect ratio setting means 21 for selecting and setting an aspect ratio of a photographing image plane, an aspect-ratio information recording means 22 for recording aspect ratio information, which represents the aspect ratio set by this aspect ratio setting means 21, on film, and a film transport means 15 for transporting the film are electrically connected to a control circuit 19 of the camera. Further, a release signal 20 is inputted to this control circuit 21 from the release button 11 (see FIG. 2) or the like.

An operation of this camera having the configuration of FIG. 3 will be described hereinbelow.

The aspect ratio of the photographing image plane is selected by the aspect ratio setting means 21. Thereby, the aspect ratio information is inputted to the control circuit 19. Thus a visual field frame in the finder is structurally switched, as will be described later in detail.

Hereupon, if a photographer depresses the release button 11 (see FIG. 2), a release signal 20 is inputted to the control circuit 19. Thus a shutter means (not shown) is activated or driven to thereby expose the film.

Upon completion of the exposure operation, the film transport means 15 advances the film by one frame. At that time, the control circuit 19 drives the aspect-ratio information recording means 22 to optically record the aspect ratio information, which is set by the aspect-ratio information setting means 21, on the film by using the an LED or the like, or to magnetically record the aspect ratio information onto a magnetic recording portion of the film by using a magnetic head or the like.

Next, the details of the finder visual field switching mechanism 6 will be described hereinbelow by referring to FIGS. 4 and 5.

A full-size frame 23 serving as a mask means for defining a finder visual field equivalent to a full-size photographing image plane is provided in the camera.

Further, a top mask 24 and a bottom mask 25, which are used to change the vertical length of the full-size visual field frame, and a lateral mask 26, which is used to change the horizontal length of the full-size visual field frame, are provided in the finder visual field switching mechanism 6.

The top mask 24 and the bottom mask 25 are formed separately from each other and are slidably fitted into a suspending shaft 27 in such a manner that the top mask 24 becomes higher than the bottom mask 25. Further, each of pins 24a and 25a is protrusively provided at an end portion of a corresponding one of the top mask 24 and the bottom mask 25.

The lateral mask 26 is formed in one piece and is vertically slidably fitted into the suspending shaft 27. Moreover, a pin 26a is protrusively provided at an end portion of this lateral mask 26.

A camshaft 28 composing a switching means is provided in the neighborhood of the suspending shaft 27 in such a manner as to be substantially parallel to the suspending shaft 27.

A cam groove 33 for the lateral mask 26, which should be engaged with the pin 26a of the lateral mask 26, and one of cam grooves 34 for the top mask 24, which should be engaged with the pin 24a of the top mask 24, and the other of the groove 34 for the bottom mask 25, which should be engaged with the pin 25a of the bottom mask 25, are cut in this camshaft 28.

Figure 4:
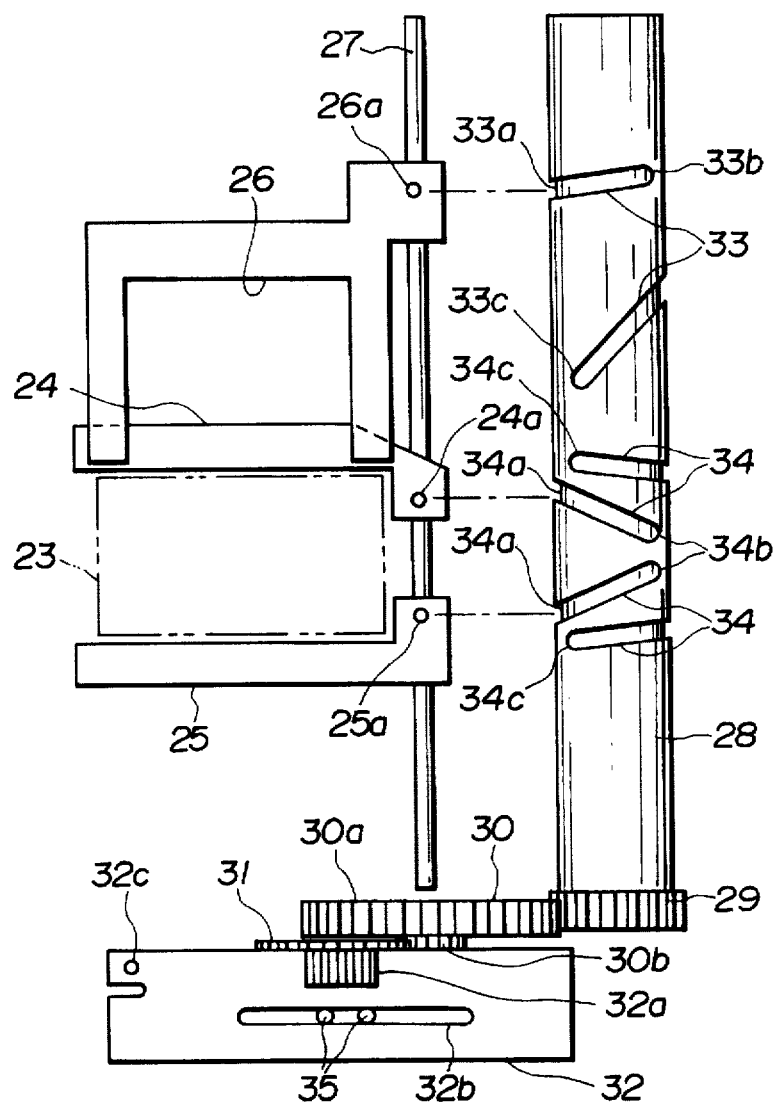
FIG. 4 is a rear view of the finder visual field switching mechanism of the first embodiment.

Incidentally, in FIG. 4, the pins 24a, 25a and 26a are illustrated as being separated from the cam grooves 33, and 34, respectively, for ready observation. Actually, however, the pins 24a, 25a and 26a are normally engaged with the cam grooves 33, 34 and 34, respectively.

A cam gear 29 is formed at the bottom portion of the camshaft 28 in such a manner that the gear 29 and the shaft 28 are integral with each other and rotate as a single piece. The cam gear 29 is held in mating engagement with a rack portion 32d of an operating member 32 through a first gear 30 and a second gear 31, as shown in FIG. 5.

Furthermore, the first gear 30 consists of a large-diameter gear 30a and a coaxial small-diameter gear 30b, which is formed in such a way as to be integral with this large-diameter gear 30a, and composes a speed increasing transmission system.

The operating member 32 is constituted by a rectangular plate-like member. A knurled operating knob 32a, an elongated hole 32b for engaging with a plurality of securing pins 35 protrusively fitted to the body of the camera (not shown), and a click portion 32c for locking the operating member 32 at each switching position are provided therein.

Further, each of the masks 24, 25 and 26 is restrained from rotating about the suspending shaft 27. This will be described by referring to FIGS. 9 and 10 which are sectional views taken in the direction perpendicular to the suspending shaft 27 and illustrate how the bottom mask 25 is fitted into the suspending shaft 27.

Figure 9:
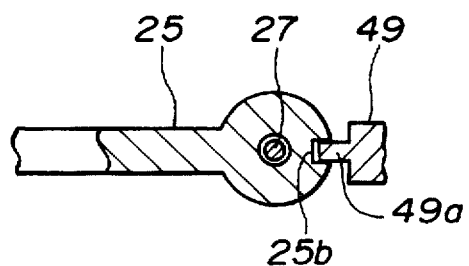
FIG. 9 is a sectional view of an example of a means for restraining the rotation of a mask of the first embodiment around a suspending shaft thereof.

As shown in FIG. 9, a concave portion 25b is formed in the bottom mask 25. A convex portion 49a of a rotation restraining member 49 is fitted into this concave portion 25b. Thereby, the bottom mask 25 is restrained from rotating around the suspending shaft 27 when the bottom mask 25 is moved along the cam groove 34 of the camshaft 28.

Such means (not shown) for restraining the rotation of the mask around the suspending shaft 27 are also provided in the top mask 24 and the lateral mask 26, respectively.

Figure 10:
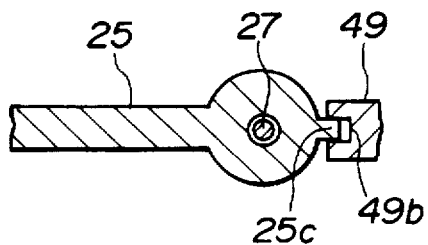
FIG. 10 is a sectional view of another example of a means for restraining the rotation of the mask of the first embodiment around the suspending shaft thereof.

Conversely, in the case of another method of FIG. 10, a convex portion 25c is formed in the bottom mask 25. This convex portion 25c is fitted into a concave portion 49b of the rotation restraining member 49. This method, however, has effects similar to those obtained in the case of FIG. 9.

Incidentally, a method for restraining the rotation of the mask around the suspending shaft 27 is not limited to these methods. Apparently, another suitable method may be employed.

Figure 8:
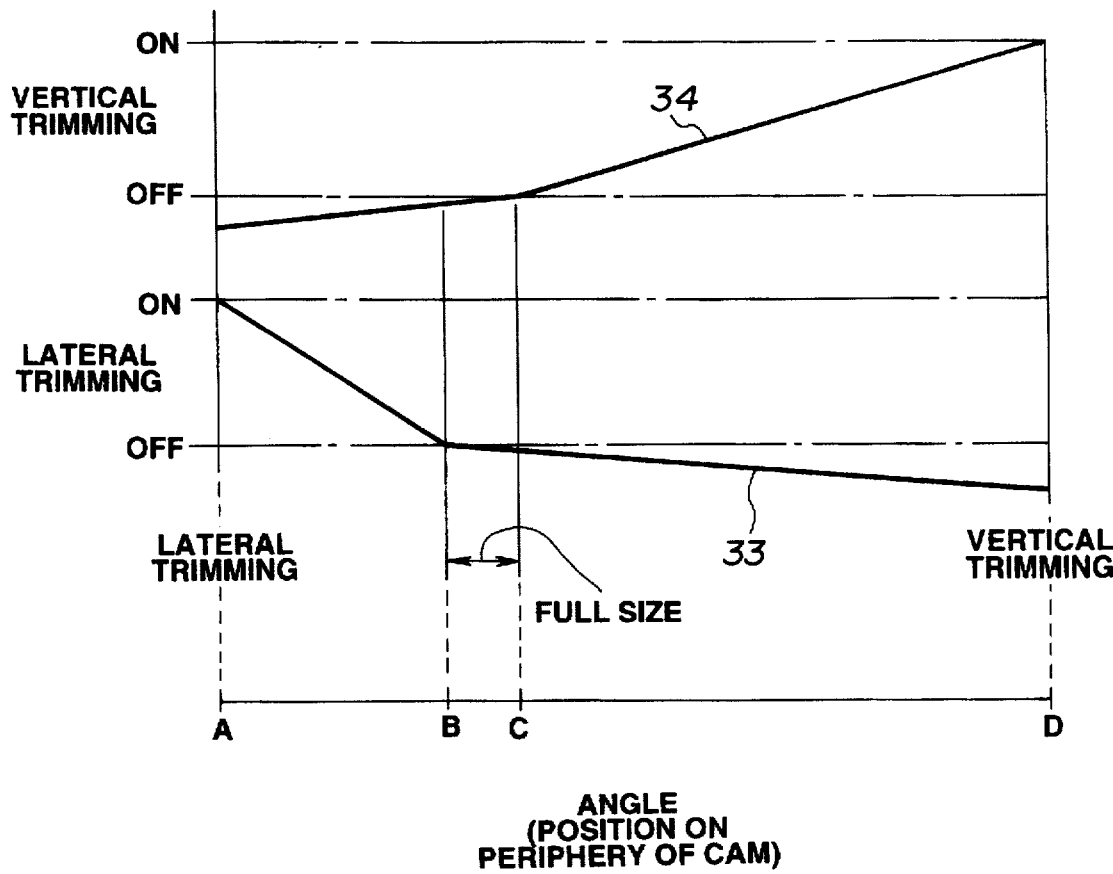
FIG. 8 is a diagram for illustrating the manner of a cam groove by unfolding a camshaft of the first embodiment.

Next, FIG. 8 is a diagram for illustrating the manner of the cam grooves 33, 34 and 34 by unfolding the camshaft 28.

In this figure, the vertical axis represents the longitudinal or vertical length of (namely, the vertical position on) the camshaft 28. Further, "ON" means that the mask is in a trimming position. Moreover, "OFF" means that the mask is in a retreating position. Furthermore, the horizontal axis represents the rotation angle of the camshaft 38, namely, the position on the periphery of each of the cam grooves 33, 34 and 34.

First, at the position A, the top mask 24 and the bottom mask 25 retreat from the full-size frame 23 a little excessively. Thus the left and right edge portions of the finder visual field are trimmed (see FIG. 7).

Figure 5:
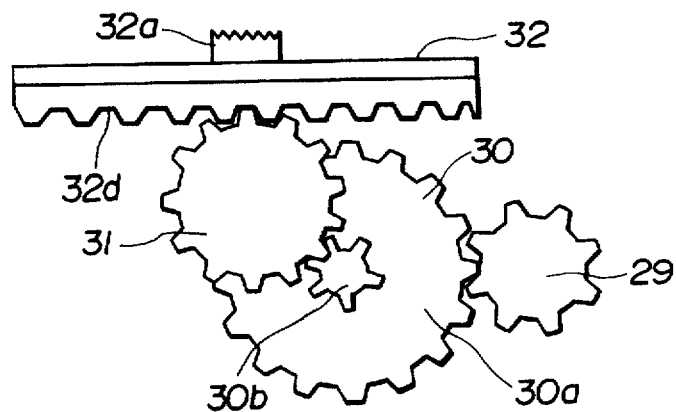
FIG. 5 is a bottom view of the finder visual field switching mechanism of the first embodiment.

Next, at any position between the positions B and C, all of the top mask 24, the bottom mask 25 and the lateral mask 26 retreat and the finder visual field is in a full-size state (see FIGS. 4 and 5).

Further, at the position D, each of the top mask 24 and the bottom mask 25 are in the trimming position, while the lateral mask 26 retreats a little excessively. Thus the top and bottom edge portions of the finder visual field are trimmed (see FIG. 6).

Next, a finder visual-field switching operation of the aforementioned finder visual field switching mechanism will be described hereinbelow by referring to FIGS. 4 to 7.

In the full-size state as illustrated in FIGS. 4 and 5, namely, in the state in which the top mask 24 and the bottom mask 25 and the lateral mask 26 retreat from the full-size frame 23, the pin 24a of the top mask 24 and the pin 25a of the bottom mask 25 engage with portions 34a and 34a of the cam grooves 34 and 34, respectively, and the pin 26a of the lateral mask 26 engages with a portion 33a of the cam groove 33.

If the operating member 32 is slid leftwardly in FIG. 4 when being in the full-size state as illustrated in FIGS. 4 and 5, the gear 29 is turned counterclockwise through the gears 31 and 30 as viewed in FIG. 5. Thereby, the camshaft 28 also rotates in the same direction.

Then, the top mask 24 and the bottom mask 25 are moved to the position for trimming or cropping the vertical length of the full-size frame 23. Moreover, the lateral mask 26 is moved to the position for retreating the mask, which is further upward than that of the mask put in the state illustrated in FIGS. 4 and 5.

Figure 6:
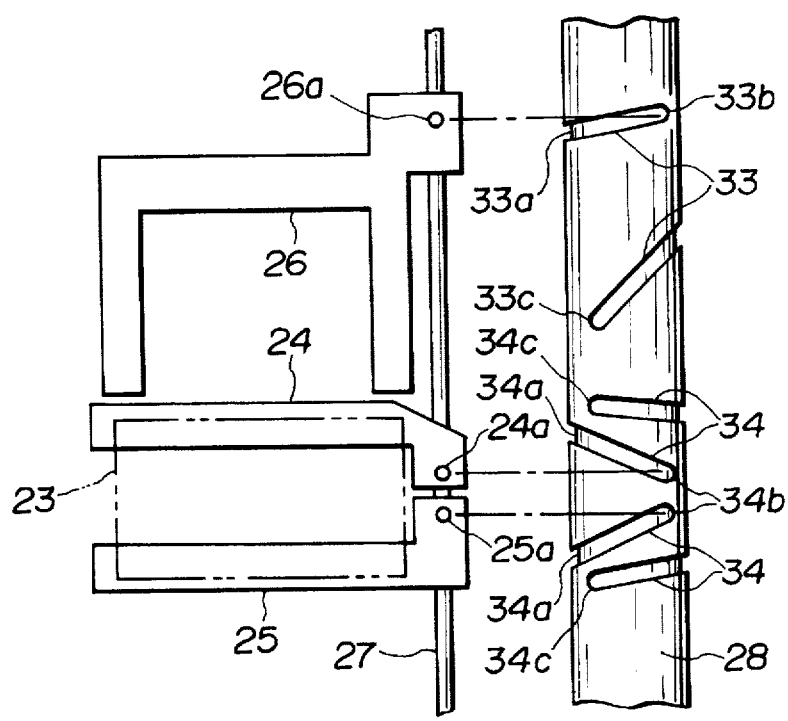
FIG. 6 is a rear view of the finder visual field switching mechanism of the first embodiment, which is in a state where this mechanism has trimmed top and bottom portions of a full-size frame.

Furthermore, as shown in FIG. 6, finally, the pins 24a and 25a come to engage with the end portions 34b and 34b of the cam grooves 34 and 34, respectively. Further, the pin 26a engages with end portion 33b of the cam groove 33. Thus the finder visual field is put into a state in which only the vertical trimming has been performed (namely, only the top and bottom edge portions thereof have been cropped).

In contrast, if the operating member 32 is slid rightwardly in FIG. 4 when being in the full-size state as illustrated in FIGS. 4 and 5, the gear 29 is turned clockwise through the gears 31 and 30 as viewed in FIG. 5. Thereby, the camshaft 28 also rotates in the same direction.

Then, the lateral mask 26 is moved to the position for trimming the horizontal length of the full-size frame 23. Moreover, the top mask 24 and the bottom mask 25 are respectively moved or retreated to the positions, which are further upward and further downward than those of these masks put in the state illustrated in FIGS. 4 and 5.

Figure 7:
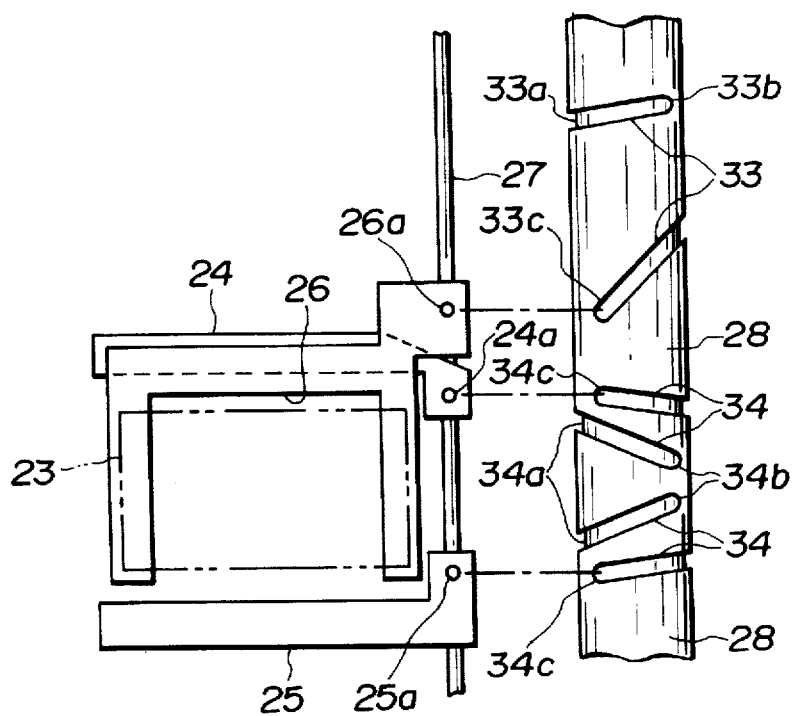
FIG. 7 is a rear view of the finder visual field switching mechanism of the first embodiment, which is in a state where this mechanism has trimmed leftmost and rightmost portions of a full-size frame.

Furthermore, as shown in FIG. 7, finally, the pins 24a and 25a come to engage with the other end portions 34c and 34c of the cam grooves 34 and 34, respectively. Further, the pin 26a comes to engage with the other end portion 33c of the cam groove 33. Thus, the finder visual field is put into a state in which only lateral trimming has been performed (namely, only the left and right edge portions thereof have been cropped).

In the case of such a first embodiment, the masks for regulating the vertical length of the frame and the mask for regulating the horizontal length of the frame can be slid in the same direction. Therefore, a space required for retreating the masks becomes small. Consequently, the size of this camera can be reduced. Moreover, with the simple structure, the camera is able to change the finder visual field among the size obtained by the vertical trimming, the size obtained by the lateral trimming and the full-size. Furthermore, the number of parts or components of the camera becomes small. This can contribute to the reduction in cost of the camera.

Figures 11, 12:
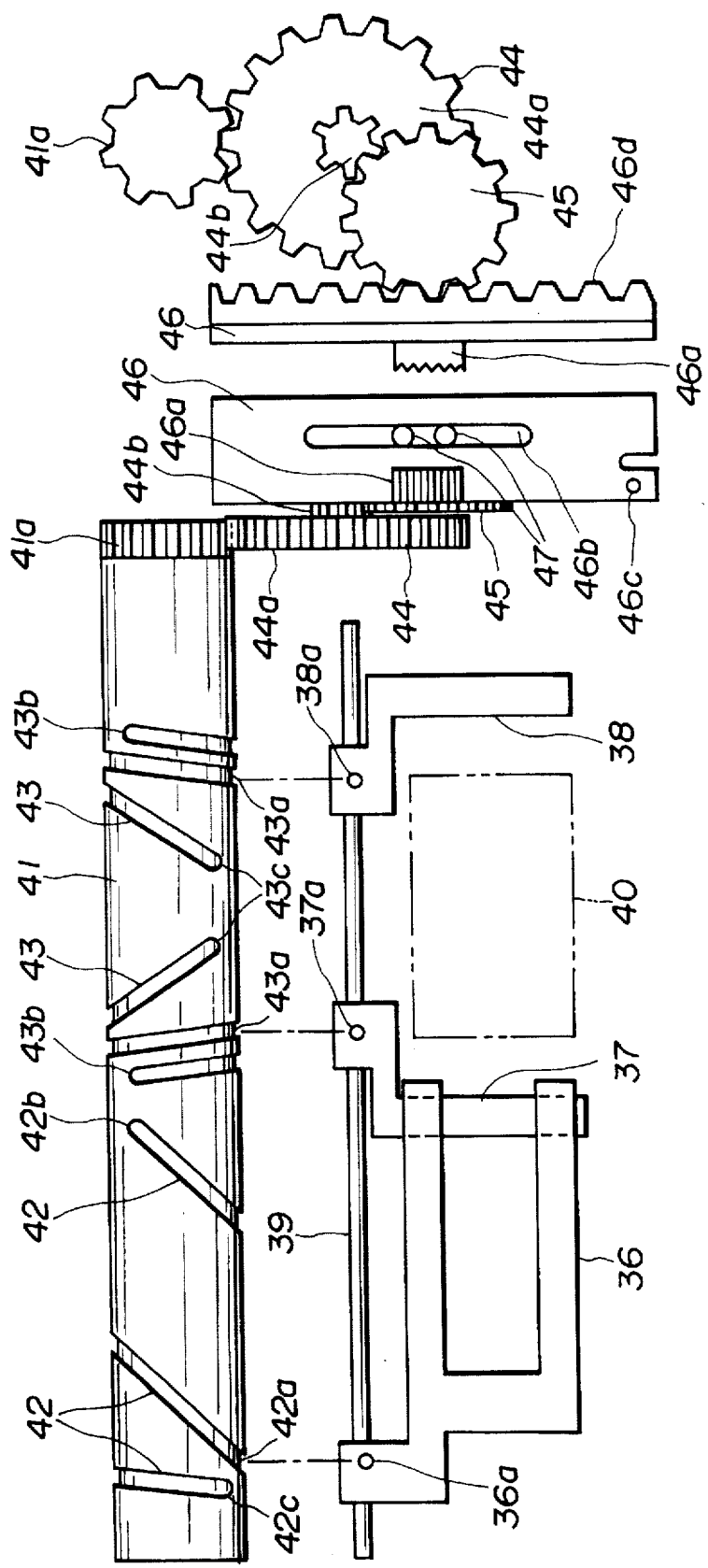
FIG. 11 is a rear view of the finder visual field switching mechanism of the second embodiment.
FIG. 12 is a bottom view of the finder visual field switching mechanism of the second embodiment.

FIGS. 11 to 14 illustrate a second embodiment of the present invention. FIG. 11 is a rear view of the finder visual field switching mechanism. FIG. 12 is a bottom view of the finder visual field switching mechanism. Incidentally, the descriptions of portions of the second embodiment, which are similar to those of the first embodiment, will be omitted. Further, only the difference between the first and second embodiments will be described hereinbelow.

The camera is provided with a full-size frame 40 serving as a mask means for defining the finder visual frame which corresponds to the full-size picture-taking image plane.

Further, the finder visual field switching mechanism of this embodiment is provided with a left mask 37 and a right mask 38, which are used to change the horizontal length of the full-size visual field frame, and a vertical mask 36 to be used to change the vertical length of the frame.

The left mask 37 and the right mask 38 are formed separately from each other and are horizontally slidably fitted upon a suspending shaft 39. Further, each of pins 37a and 38a is protrusively provided at an end portion of a corresponding one of the left mask 37 and the right mask 38.

The vertical mask 36 is formed in one piece and is horizontally slidably fitted upon the suspending shaft 39. Moreover, a pin 36a is protrusively provided at an end portion of this vertical mask 36.

A camshaft 41 is provided in the vicinity of the suspending shaft 37 in such a manner as to be almost parallel to this suspending shaft 37.

A cam groove 42 for the vertical mask 36, which should be engaged with the pin 36a of the vertical mask 36, and one of cam grooves 43 for the left mask 37, which should be engaged with the pin 37a of the left mask 37, and the other of the grooves 43 for the right mask 38, which should be engaged with the pin 28a of the bottom mask 38, are cut in this camshaft 41.

Incidentally, in FIG. 11, the pins 36a, 37a and 38a are illustrated as being separated from the cam grooves 42, 43 and 43, respectively, for ready viewing. Actually, however, the pins 36a, 37a and 37a are normally engaged with the cam grooves 42, 43 and 43, respectively.

A cam gear 41a is formed at the bottom portion of the camshaft 41 in such a manner that the gear 41a and the shaft 41 are integral with each other and rotate as a single piece. The cam gear 41a is held in mating engagement with a rack portion 46d of an operating member 46 through a first gear 44 and a second gear 45.

Furthermore, the first gear 44 consists of a large-diameter gear 44a and a coaxial small-diameter gear 44b, which is formed in such a way as to be integral with large-diameter gear 44a, and composes a speed increasing transmission system.

The operating member 46 is constituted by a rectangular plate-like member. A knurled operating knob 46a, an elongated hole 46b for engaging with a plurality of securing pins 47 protrusively fitted to the body of the camera (not shown), and a click portion 46c for locking the operating member 46 at each switching position are provided therein.

Next, a finder visual-field switching operation of the aforementioned finder visual field switching mechanism will be described hereinbelow by referring to FIGS. 11 to 14.

In the full-size state as illustrated in FIGS. 11 and 12, namely, in the state in which the left mask 37 and the right mask 38 and the vertical mask 36 retreat from the full-size frame 40, the pin 37a of the left mask 37 and the pin 38a of the right mask 38 engage with portions 43a and 43a of the cam grooves 43 and 43, respectively, and the pin 36a of the left-hand and right-hand vertical mask 36 engages with a portion 42a of the cam groove 42.

If the operating member 46 is slid downwardly in FIG. 11 when being in the full-size state as illustrated in FIGS. 11 and 12, the gear 41a is turned counterclockwise through the gears 45 and 44 as viewed in FIG. 12. Thereby, the camshaft 41 also rotates in the same direction.

Then, the vertical mask 36 is moved to the position for trimming the vertical length of the full-size frame 40. Moreover, the left mask 37 and the right mask 38 are moved or retreated to the more leftward and rightward positions from those of these masks put in the state illustrated in FIGS. 11 and 12.

Figure 13:
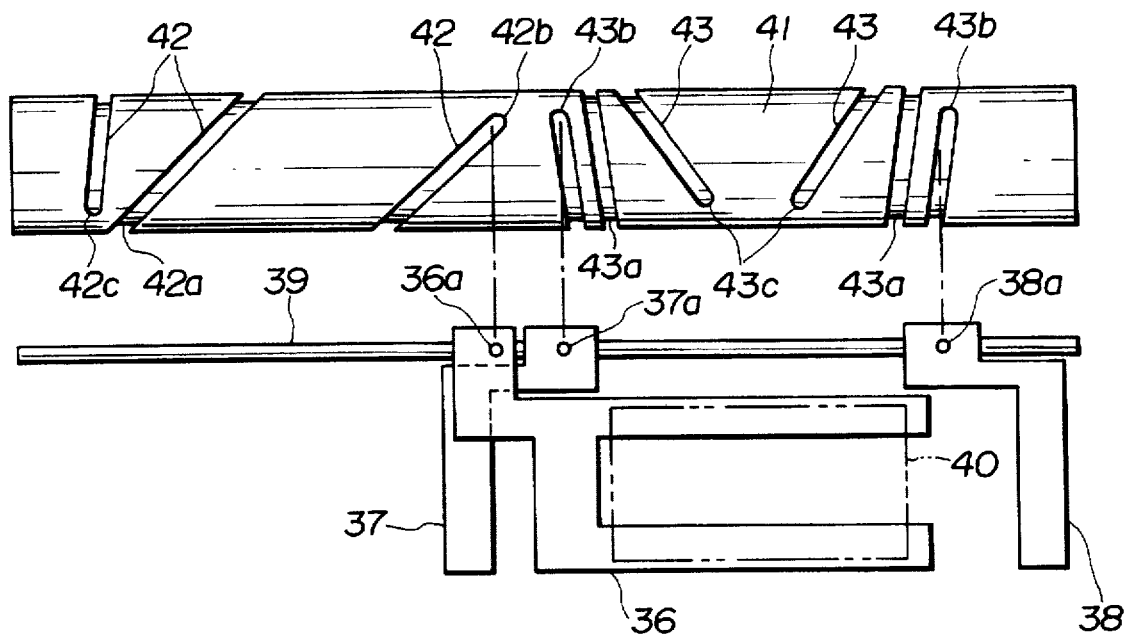
FIG. 13 is a rear view of the finder visual field switching mechanism of the second embodiment, which is in a state where this mechanism has trimmed top and bottom portions of a full-size frame.

Furthermore, as shown in FIG. 13, finally, the pins 37a and 38a come to engage with the end portions 43b and 43b of the cam grooves 43 and 43, respectively. Thus, the finder visual field is put into a state in which only the vertical trimming has been performed (namely, only the top and bottom edge portions thereof has been cropped).

In contrast, if the operating member 46 is slid upwardly in FIG. 11 when being in the full-size state as illustrated in FIGS. 11 and 12, the gear 41a is turned clockwise through the gears 45 and 44 as viewed in FIG. 12. Thereby, the camshaft 41 also rotates in the same direction.

Then, the left mask 37 and the right mask 38 are respectively moved to the trimming positions for the horizontal length of the full-size frame 40, namely, the position for trimming the left edge portion thereof and that for trimming the right edge portion thereof. Moreover, the vertical mask 36 is retreated to the more leftward position from the position of this mask put in the state illustrated in FIGS. 11 and 12.

Figure 14:
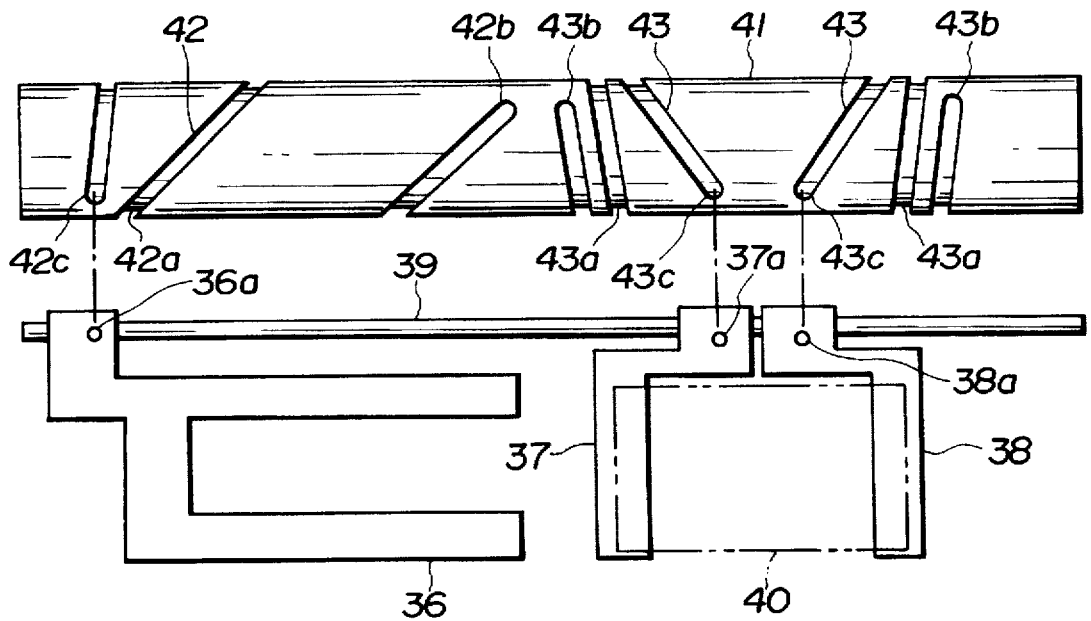
FIG. 14 is a rear view of the finder visual field switching mechanism of the second embodiment, which is in a state where this mechanism has trimmed leftmost and rightmost portions of a full-size frame.

Furthermore, as shown in FIG. 14, finally, the pins 37a and 38a come to engage with the other end portions 43c and 43c of the cam grooves 43 and 43, respectively. Further, the pin 36a comes to engage with the other end portion 42c of the cam groove 42. Thus the finder visual field is put into a state in which only the lateral trimming has been performed (namely, only the left and right edge portions thereof have been cropped).

Incidentally, the cam grooves 42, 43 and 43 of the camshaft 41 of the second embodiment are formed similarly as illustrated in FIG. 8. Further, the masks 36, 37 and 38 are restrained from rotating around the suspending shaft 39, with the structure which is substantially the same as illustrated in FIG. 9 or 10.

In the case of such a second embodiment, effects similar to those of the first embodiment can be obtained. Moreover, a space required for retreating the finder can be reduced.

Incidentally, in the aforesaid first and second embodiments, the top and bottom masks (or the vertical mask) and the left and right masks (or the lateral mask) are moved by using a single camshaft. Apparently, the single camshaft may be divided. Namely, a camshaft for moving the top and bottom masks (or the vertical mask) and another camshaft for moving the left and right masks (or the lateral mask) may be provided in the mechanism.

Figure 15:
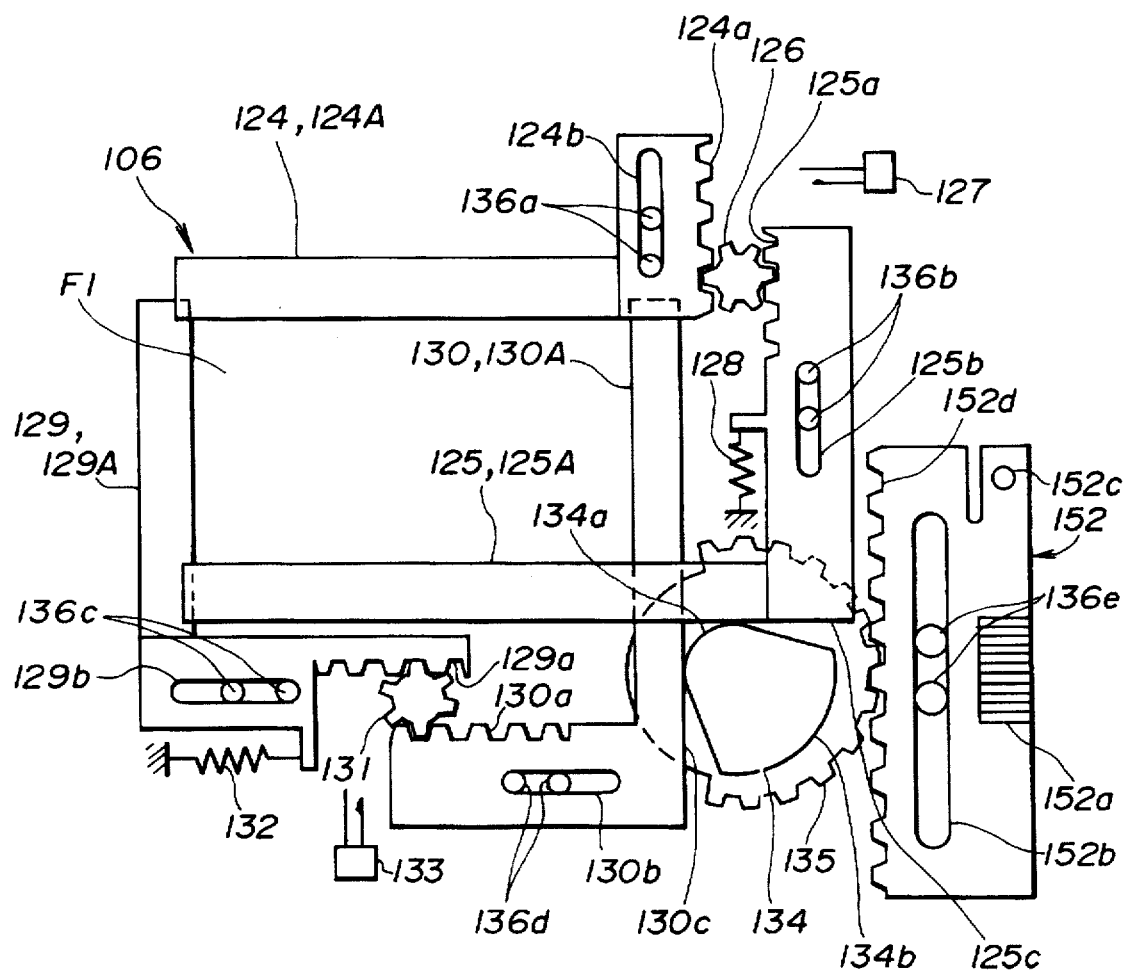
FIG. 15 is a diagram for illustrating the placement of a finder visual field frame switching mechanism of a camera which is a third embodiment of the present invention.
Figure 16:
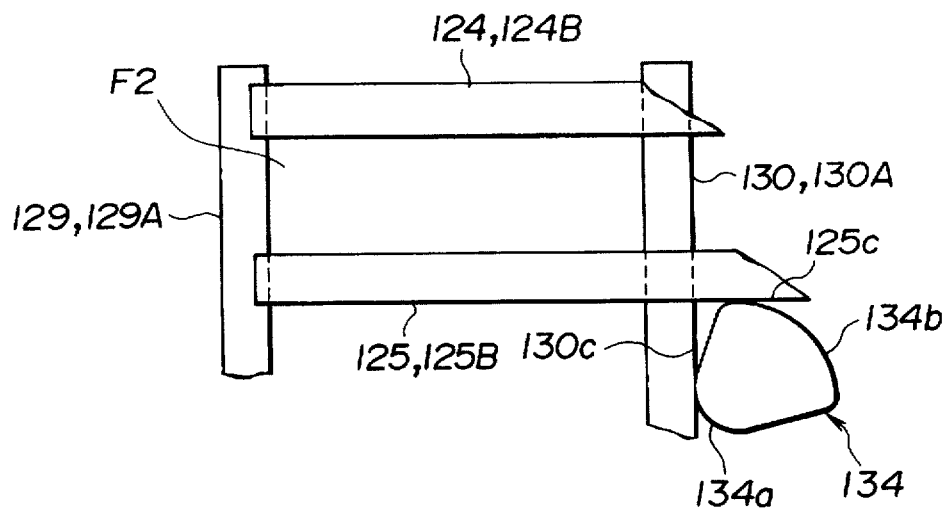
FIG. 16 is a diagram for illustrating an operation of the finder visual field frame switching mechanism of the third embodiment at the time of performing a vertical trimming.
Figure 17:
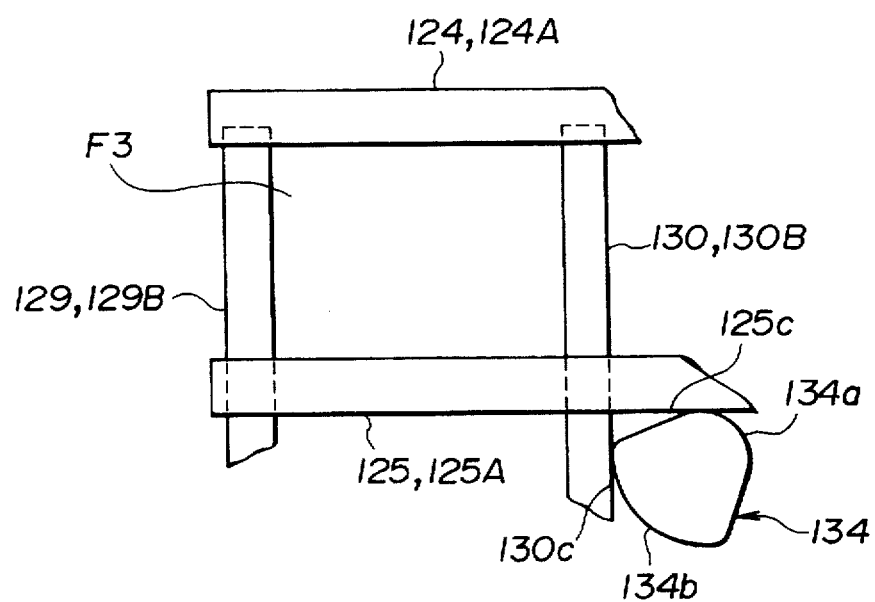
FIG. 17 is a diagram for illustrating an operation of the finder visual field frame switching mechanism of the third embodiment at the time of performing a lateral trimming.

FIGS. 15 to 17 illustrate a third embodiment of the present invention.

First, the configuration of a finder visual field frame switching mechanism 106 of this third embodiment will be described hereunder by referring to FIG. 15 which is a diagram for illustrating the configuration of this finder visual field frame switching mechanism.

As shown in this figure, the finder visual field frame switching mechanism 106 is comprised mainly of top and bottom masks 124 and 125 which serve as a first mask consisting of a pair of mask plates for trimming a visual field frame in the longitudinal, namely, vertical direction; left and right masks 129 and 130 which serve as a second mask consisting of a pair of mask plates for trimming a visual field frame in the transverse, namely, horizontal (or lateral) direction; a cam gear 135 having a cam 134 which serves as a cam means; a mask operating member 152 which serves as the aspect ratio setting means 21 (FIG. 3) and can move vertically; a vertical trimming switch 127 for detecting information on the trimming movement positions of the top and bottom masks 124 and 125, which correspond to the aspect ratio information; and a lateral trimming switch 133 for detecting information on the trimming movement positions of the left and right masks 129 and 130, which correspond to the aspect ratio information.

Each of elongated holes 124b and 125b is bored in an end portion of a corresponding one of the top and bottom masks 124 and 125. These elongated holes 124b and 125b are respectively fitted to receive top mask pins 136a and bottom mask pins 136b fixed to the body of the camera (not shown). Thereby, the top mask 124 and the bottom mask 125 are supported in such a manner as to be able to move vertically, while maintaining the parallel positional relation therebetween.

A rack portion 124a and a rack portion 125a are respectively formed in an end portion of the top mask 124, which corresponds to the elongated hole 124b, and an end portion of the bottom mask 125a, which corresponds to the elongated hole 125b. Both of these rack portions 124a and 125a mesh with a pinion gear 126 which serves as a first interlocking means. Thereby, the top mask 124 and the bottom mask 125 interlock with each other and move in opposite directions.

Further, a vertical mask retreating spring 128 for always pushing each of the top and bottom masks 124 and 125 in a direction, in which the mask is retreated, is suspended on the bottom mask 125. A plane abutting portion 125c, which is the bottom face of the bottom mask 125, is always in abutting engagement with the cam face or surface of the cam 134.

Therefore, if the bottom mask 125 is driven as the cam 134 rotates, the top mask 124 is linked with the bottom mask and is moved. Thus, these masks are respectively moved to retreating positions 124A and 125A of FIGS. 16 and 17 (to be described later) and to trimming positions (approaching positions) 124B and 125B of these figures (to be described later).

Incidentally, the retreating position of the mask is the position of the finder visual field frame F1 corresponding to the full-size photographing image plane. Further, the trimming position of the mask is a predetermined position, into which the mask goes, in the range of the finder visual field frame F1.

Each of elongated holes 129b and 130b is bored in an end portion of a corresponding one of the left and right masks 129 and 130. These elongated holes 129b and 130b are respectively fitted to receive left mask pins 136c and right mask pins 136d fixed to the body of the camera. Thereby, the left mask 129 and the right mask 130 are supported in such a manner as to be able to move horizontally, while maintaining the parallel positional relation therebetween.

A rack portion 129a and a rack portion 130a are respectively formed in an end portion of the left mask 129, which corresponds to the elongated hole 129b, and an end portion of the right mask 130, which corresponds to the elongated hole 130b. Both of these rack portions 129a and 130a mesh with a pinion gear 131 which serves as a second interlocking means. Thereby, the left mask 129 and the right mask 130 interlock with each other and move in opposite directions.

Further, a lateral mask retreating spring 132 for always pushing each of the left and right masks 129 and 130 in a direction, in which the mask is retreated, is suspended on the left mask 132. A plane abutting portion 130c, which is the right-side face of the right mask 130, is always in abutting engagement with the cam face of the cam 134.

Therefore, if the right mask 130 is driven as the cam 134 rotates, the left mask 129 is linked with the bottom mask and is moved. Thus these masks are respectively moved to trimming positions, namely, approaching positions 129B and 130B of FIGS. 16 and 17 (to be described later) and to retreating positions 129A and 130A of these figures (to be described later).

The cam 134, which is formed on the cam gear 135 in such a manner as to be integral therewith, has a cam face consisting of a round bottom portion 134a and a outer round portion 134b. Further, the cam gear 135 meshes with a rack portion 152d of the vertically movable mask operating member 152. The cam 134 is rotated by vertically operating this mask operating member 152.

A vertically or longitudinally elongated hole 152b is bored in the mask operating member 152. A fixing operation member comprised of pin 136e attached to the body of the camera is fitted into elongated hole 152b. Thereby, the mask operating member 152 is guided in the vertical direction. Further, an operating portion 152a, in which an antislipping pattern is cut in such a manner as to be easy to operate with fingers, and an elastically deformable click portion 152c, which is clicked into place at an upper or lower position of the operating member 152 so as to hold this member 152, are provided in this member 152.

The vertical trimming switch 127 is constituted by, for example, what is called a leaf switch or the like. When the top mask 124 and the bottom mask 125 are moved upwardly and downwardly to the trimming positions 124B and 125B of FIG. 16, respectively, the vertical trimming switch 127 is operated by a leading end portion of the bottom mask 125, so that the switch 127 outputs an "ON" signal representing the aspect ratio information.

The lateral trimming switch 133 is constituted by, for instance, what is called a leaf switch or the like. When the left mask 129 and the right mask 130 are moved rightwardly and leftwardly to the trimming positions 129B and 130B of FIG. 17, respectively, the vertical lateral trimming switch 133 is operated by a leading end portion of the right mask 130, so that the switch 133 outputs an "ON" signal representing the aspect ratio information.

Next, a switching operation of the finder-visual-field frame switching mechanism 106 of the camera of the third embodiment constructed as described hereinabove will be described by referring to FIGS. 15 to 17.

FIG. 15 illustrates the state of the mechanism in which the mask operating member 152 is put back to a neutral position. The abutting portion 125c of the bottom mask and the abutting portion 130c of the right mask 130 are in abutting engagement with the bottom round portion 134a of the cam 134. Thus, the top and bottom masks 124 and 125 and the left and right masks 129 and 130 are at the retreating positions 124A, 125A, 129A and 130A where the masks retreat to a position most remote from the full-size frame. Namely, these masks form the visual field frame F1 corresponding to the full-size photographing image plane. The state of the mechanism, in which the visual field frame F1 is set by the masks, will be referred hereunder to as a first state.

When the mask operating member 152 is slid upwardly from the position thereof put in the first state of FIG. 15, the cam 134 turns anticlockwise through the rack portion 152d and the cam gear 135. Thus, the masks are brought into a state as illustrated in FIG. 16.

At that time, the bottom mask 125 moves along the cam face of the cam 134, so that the abutting portion 125c thereof becomes in abutting engagement with the outer round portion 134b, namely, this mask is moved to the trimming position 125B. The top mask 124 is also moved through the pinion gear 126 to the trimming position 124B.

On the other hand, the right mask 130 maintains the state in which the abutting portion 130c thereof is in abutting engagement with the bottom round portion 134a of the cam. The left and right masks 129 and 130 still remain in the retreated positions 129A and 130A similarly as illustrated in FIG. 15.

Thus, in the state of FIG. 16, only a vertical trimming visual field frame F2 corresponding to an image plane obtained as a result of a vertical (or longitudinal) trimming, namely, of trimming only the top and bottom edge portions thereof is formed. The state of the mechanism, in which the visual field frame F2 is set by the masks, will be referred hereunder to as a second state.

Incidentally, in the case where the mechanism is set in this second state, the vertical trimming switch 127 is turned on and a signal outputted from this switch is inputted to the control circuit 19 as representing the aspect ratio.

Further, when the mask operating member 152 is slid downwardly from the position thereof put in the second state of FIG. 15, the cam 134 is turned counterclockwise through the rack portion 152d and the cam gear 135. Consequently, the masks are brought into a state as illustrated in FIG. 17.

At that time, the right mask 130 moves along the cam face of the cam 134, so that the abutting portion 130c thereof becomes in abutting engagement with the outer round portion 134b, namely, this mask is moved to the trimming position 130B. The left mask 129 is also moved through the pinion gear 131 to the trimming position 129B.

On the other hand, the bottom mask 125 maintains the state in which the abutting portion 125c thereof is in abutting engagement with the bottom round portion 134a of the cam. The top and bottom masks 124 and 125 still remain in the retreated positions 124A and 125A similarly as illustrated in FIG. 15.

Thus, in the state of FIG. 17, only a lateral trimming visual field frame F3 corresponding to an image plane obtained as a result of a horizontal (or lateral) trimming, namely, of trimming only the left and right edge portions thereof is formed. The state of the mechanism, in which the visual field frame F3 is set by the masks, will be referred hereunder to as a third state.

When the mechanism is set in this third state, the lateral trimming switch 133 is turned on and a signal outputted from this switch is inputted to the control circuit 19 as representing the aspect ratio.

Further, in the case where the finder visual field frame is changed from the frame F2 corresponding to the second state into the frame F3 corresponding to the third state, or in the case where the finder visual field frame is changed from the frame F3 corresponding to the third state into the frame F2 corresponding to the second state, the mask operating member 152 once passes through the neutral position of FIG. 15. Therefore, the finder visual field frame is changed into the frame F2 or F3 through the frame F1 corresponding to the first state, namely, corresponding to the full-size image plane.

Thus, when setting the size of the photographic image plane, the visual field frame F1 corresponding to the full-size photographic image plane is employed as a reference. If the operating member 152 is slid upwardly, the visual field frame can be changed into the frame F2 corresponding to a photographic image plane obtained by performing only a vertical (or longitudinal) trimming thereon. Moreover, if the operating member 152 is slid downwardly, the visual field frame can be changed into the frame F3 corresponding to a photographic image plane obtained by performing only a horizontal (or lateral) trimming thereon.

Further, when changing the visual field frame, the aspect ratio information is inputted to the control circuit 19 according to output signals of the vertical and lateral trimming switches 127 and 133 corresponding to the trimming state. When film is wound after taking pictures, the aspect ratio information is recorded on the film by the aspect-ratio information recording means 22. This aspect ratio information is read and referred to when printing. Thus a trimming is performed on a print according to this information.

In the case of the camera of such a third embodiment, when the visual field frame is changed into the frame F2 or F3, which corresponds to the vertical or lateral trimming, by performing the aforementioned visual-field-frame switching operation, the frame should be changed thereto through the frame F1 corresponding to the full-size image plane at all times. Therefore, the top and bottom masks do not move simultaneously with the left and right masks at all. Consequently, when the visual field frame is changed during looking at a subject through the finder, the motions of the masks appears to be natural. Moreover, the possibility of an occurrence of a malfunction is eliminated.

Further, the visual field frame switching mechanism itself is a simplified mechanism. Therefore, a space required for retreating each of the masks can be limited to a small space. Consequently, the size of the camera can be reduced.

Incidentally, in the case of the visual field frame switching mechanism of the camera of the third embodiment, the top and bottom masks and the left and right masks are moved by using the same cam 134. In the case of an example of a modification of this camera, the top and bottom masks may be driven by using a cam member other than a cam member to be used for driving the left and right masks.

Next, the finder visual field frame switching mechanism of a camera of a fourth embodiment of the present invention will be described hereinbelow. Incidentally, it is assumed that the optical system and the control portion for changing the size of the photographing image plane of the camera of this embodiment are the same as those of the aforementioned first embodiment illustrated in FIGS. 1 and 3.

Figure 18:
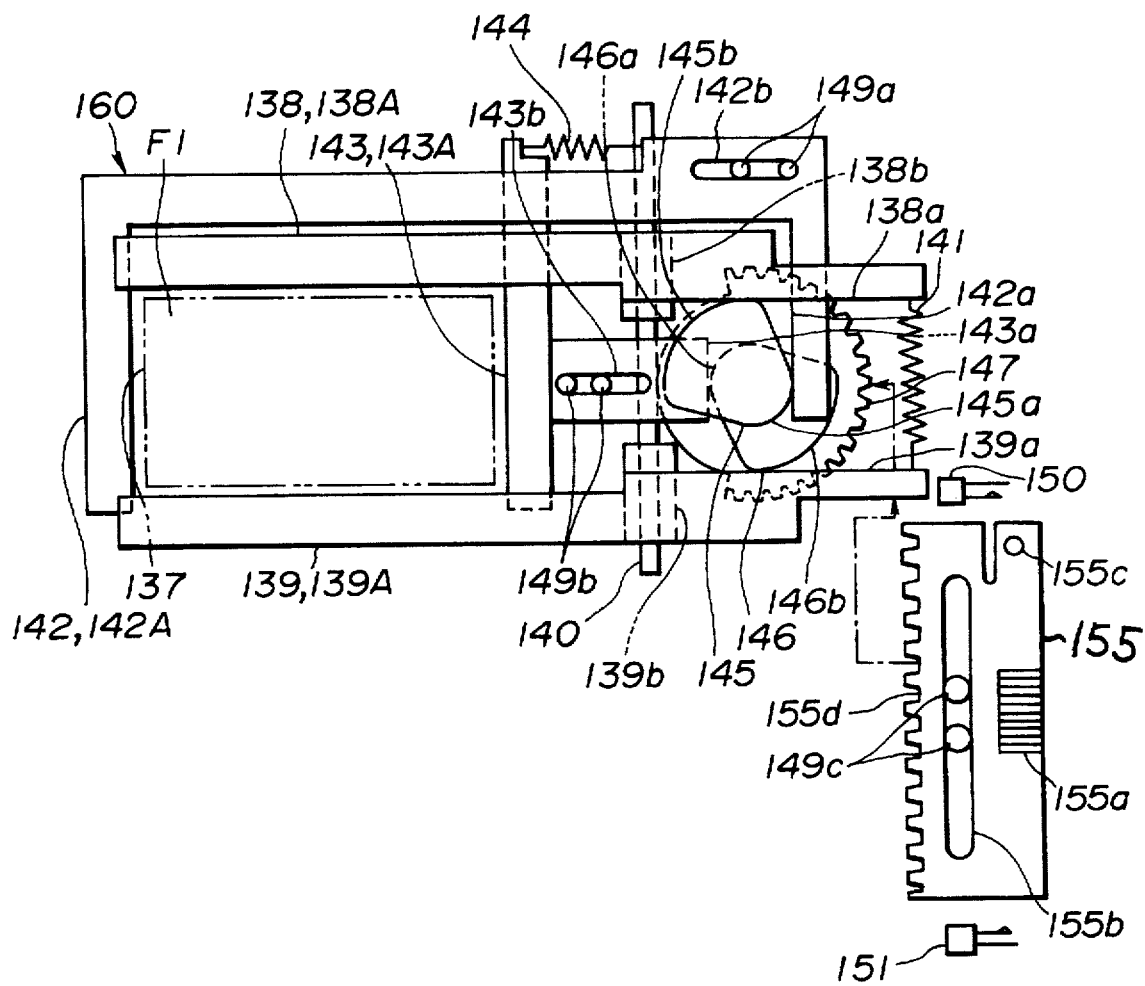
FIG. 18 is a diagram for illustrating the placement of a finder visual field frame switching mechanism of a camera which is a fourth embodiment of the present invention.

FIG. 18 illustrates a finder visual field frame switching mechanism 160 which acts as the visual field frame switching means of the camera of this embodiment.

This finder visual field frame switching mechanism 160 consists mainly of top and bottom masks 138 and 139 which serve as a first mask consisting of a pair of mask plates for trimming a visual field frame in the longitudinal, namely, vertical direction; left and right masks 142 and 143 which serve as a second mask consisting of a pair of mask plates for trimming a visual field frame in the transverse, namely, horizontal (or lateral) direction; a finder frame 137 serving as a third mask, which corresponds to a full-size photographic image plane; a cam gear 147 having a cam 145, which serves as a first cam means, and a cam 146 which serves as a second cam means; a mask operating member 155 which serves as the aspect ratio setting means 21 and can move vertically; a vertical trimming switch 150 for detecting information on the trimming movement positions of the top and bottom masks 138 and 139, which correspond to the aspect ratio information; and a lateral trimming switch 151 for detecting information on the trimming movement positions of the left and right masks 142 and 143, which correspond to the aspect ratio information.

The top and bottom masks 138 and 139 have fitting portions 138b and 139b fitted into a guide shaft 140, respectively, and are vertically slidably supported thereon.

The top and bottom masks 138 and 139 have leg portions 138a and 139a extending from the right ends thereof in a direction opposite to the direction from the right ends thereof to the fitting portions 138b and 139b, respectively. A vertical mask spring 141 is suspended between the tips of the leg portions 138a and 139a. Thereby, the top and bottom masks 138 and 139 are always pressed in the directions in which the leg portions 138a and 139a of the top and bottom masks 138 and 139 are brought into abutting engagement with the cams 145 and 146, respectively, namely, in the trimming directions.

The left and right masks 142 and 143 have elongated holes 142b and 143b, into which a pair of left mask pins 149a and right mask pins 149b fixed to the body of the camera are fitted, respectively, and are laterally slidably supported thereon.

Further, a lateral mask spring 144 is suspended between these left and right masks 142 and 143. Thereby, these masks are pushed or pressed in the directions in which the leg portions of the left and right masks 142 and 143 are brought into abutting engagement with the cams 145 and 146, namely, in the retreating directions, respectively.

Figure 19:
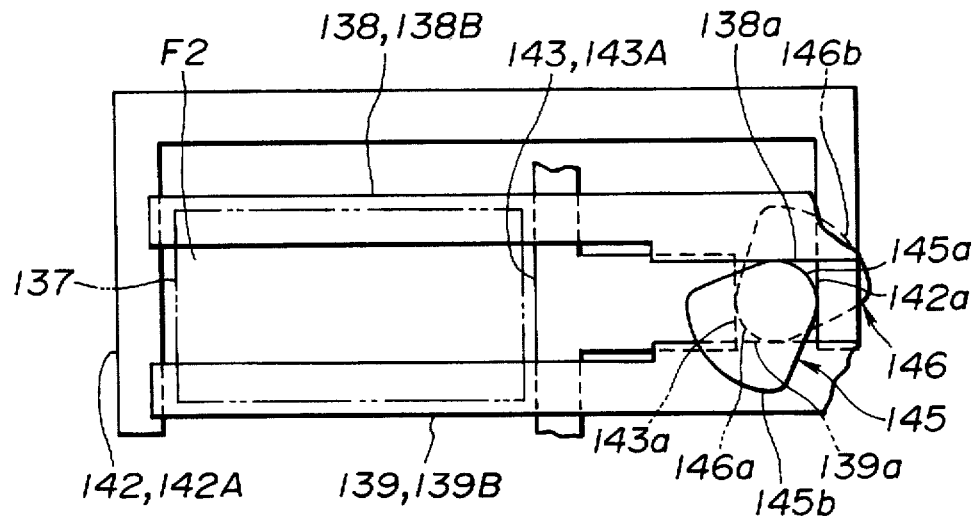
FIG. 19 is a diagram for illustrating an operation of the finder visual field frame switching mechanism of the fourth embodiment at the time of performing a vertical trimming.
Figure 20:
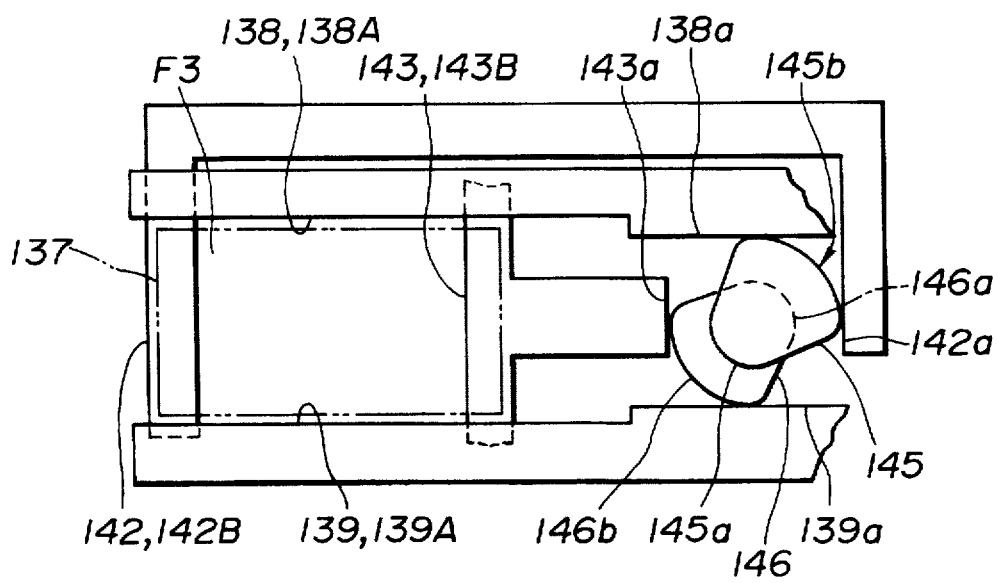
FIG. 20 is a diagram for illustrating an operation of the finder visual field frame switching mechanism of the fourth embodiment at the time of performing a lateral trimming.

The cam 145 has the form of a double-lift cam and is operative to drive the masks 138 and 142 to move to the retreating positions 138A and 142A and to the trimming positions 138B and 142B, respectively, as illustrated in FIGS. 19 and 20 (to be described later).

Further, similarly, the cam 146 has the form of a double-lift cam and is operative to drive the masks 139 and 143 to move to the retreating positions 139A and 143A and to the trimming positions 139B and 143B, respectively, as illustrated in FIGS. 19 and 20 (to be described later).

Incidentally, the retreating position of the mask is the position of the finder visual field frame F1 (see FIG. 18) of the finder frame 137, which corresponds to the full-size photographing image plane. Further, the trimming position of the mask is a predetermined position, to which the mask goes and moves, in the range of the finder visual field frame F1.

Furthermore, the cams 145 and 146, which are double-lift lift cams, are formed on the cam gear 147 in such a manner as to be integral with each other and are driven by a rack portion 155d of the mask operating member 155 through an epicyclic or planetary gear (not shown) to rotate.

An operating portion 155a for performing a sliding operation, an elastically deformable click portion 155c for holding the operating member 152 at a selected switching portion, and an elongated hole 155b are provided in this member 152. Further, a pair of guide pins 149c secured to the body (not shown) of the camera are fitted into the elongated hole 155b, and thus the operating member 155 can slide in the vertical direction.

Next, a switching operation of the finder-visual-field frame switching mechanism 106 of the camera of the fourth embodiment constructed as described hereinabove will be described by referring to FIGS. 18 to 20.

When the mask operating member 155 is in a neutral position, the top and bottom masks 138 and 139, as well as the left and right masks 142 and 143, are in abutting engagement with the outer round portions 145b and 146b and the bottom round portions 145a and 146a of the cam 145 and 146, respectively. Further, the top and bottom masks 138 and 139 and the left and right masks 142 and 143 are at the retreating positions 138A, 139A, 142A and 143A. In this state, the finder visual field frame is the visual field frame F1 corresponding to the full-size photographing image plane. This state will be referred hereunder to as a first state.

When the mask operating member 155 is slid upwardly from the neutral position, the cams 145 and 146 turn anticlockwise by 90°, with the result that the top and bottom masks 138 and 139 become in abutting engagement with the bottom round portions 145a and 146a of the cams and are then moved to the trimming positions 138B and 139B, respectively, as illustrated in FIG. 19. At that time, the top and bottom masks 142 and 143 are in abutting engagement with the bottom round portions 145a and 146a of the cams 145 and 146 and are at the retreating positions 142A and 143A, respectively. In this state, the finder visual field (frame) becomes a vertical trimming visual field frame F2 corresponding to an image plane obtained as a result of a vertical (or longitudinal) trimming, namely, of trimming only the top and bottom edge portions thereof is formed. This state will be referred hereunder to as a second state.

Further, in the case where the mechanism is set in this second state, the vertical trimming switch 150 provided above the top of the operating member 155 is turned on and a signal outputted from this switch is inputted to the control circuit 19 as representing the aspect ratio. Thereafter, this signal is recorded on film at the time of advancing the film after taking a picture.

In contrast, when the mask operating member 155 is slid downwardly from the neutral position thereof, the cams 145 and 146 rotate clockwise by 90°, with the result that the left and right masks 142 and 143 become in abutting engagement with the outer round portions 145b and 146b of the cams and are then moved to the trimming positions 142B and 143B, respectively, as illustrated in FIG. 20. At that time, the top and bottom masks 138 and 139 are in abutting engagement with the outer round portions 145b and 146b of the cams and are at the retreating positions 138A and 139A, respectively. In this state, the finder visual field (frame) becomes a lateral trimming visual field frame F3 corresponding to an image plane obtained as a result of a horizontal (or lateral) trimming, namely, of trimming only the left and right edge portions thereof is formed. This state will be referred hereunder to as a third state.

Furthermore, when the mechanism is set in this third state, the lateral trimming switch 151 provided under the operating member 155 is turned on and a signal outputted from this switch is inputted to the control circuit 19 as representing the aspect ratio. Thereafter, this signal is recorded on the film at the time of advancing the film after taking a picture.

Further, in the case where the finder visual field frame is changed from the frame F2 corresponding to the second state into the frame F3 corresponding to the third state in this finder visual field frame switching mechanism 160, or in the case where the finder visual field frame is changed from the frame F3 corresponding to the third state into the frame F2 corresponding to the second state in this finder visual field frame switching mechanism 160, the finder visual field frame of the mask operating member 155 is once changed to the frame F1 of the first state of FIG. 18, which corresponds to the full-size photographing image plane, and thereafter the state of this member is changed into the frame F3 or F2.

In the case of the camera of such a fourth embodiment, effects similar to those of the third embodiment can be obtained by driving the top, bottom, left and right masks by use of the double-lift cams 145 and 146.

Moreover, in the case of the fourth embodiment, the pinion gear drive system becomes unnecessary. Furthermore, the masks are driven by using the springs instead of this system and being brought into the cam faces. Thus a space required for providing the switching mechanism in the camera can be reduced to a small space. Consequently, the size of the camera can be decreased.

Furthermore, in the case of this embodiment, the visual field frame is changed among three kinds of frames, namely, the frame F1 corresponding to the full-size photographing image plane, the frame F2 corresponding to the vertical trimming and the frame F3 corresponding to the lateral trimming. In the case of an example of a modification of this embodiment, however, the trimming positions of the top and bottom masks 138 and 139 or the left and right masks 142 and 143 may be changed among multiple stages correspondingly to the trimming photographing image plane of the various sizes.

Figure 23:
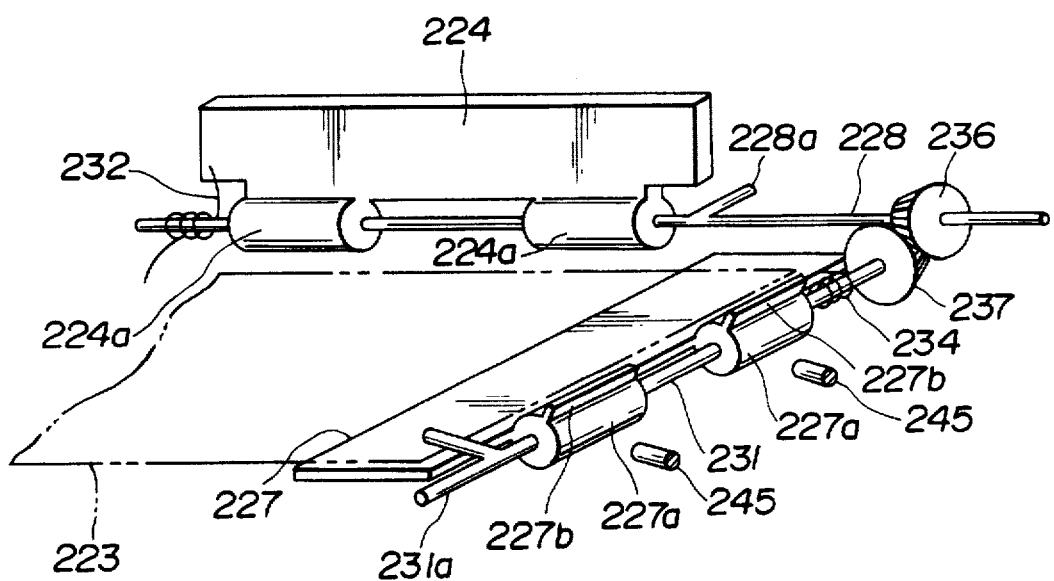
FIG. 23 is a perspective diagram for illustrating a primary portion of the finder visual field frame switching mechanism of the camera, namely, the fifth embodiment.

FIGS. 21 to 26 illustrate a fifth embodiment of the present invention. FIG. 21 is a front view of a finder visual field frame switching mechanism of a camera of this embodiment. FIG. 22 is a side view of an operating lever of the finder visual field frame switching mechanism of this camera. FIG. 23 is a perspective diagram for illustrating a primary portion of the finder visual field frame switching mechanism of this camera. Hereinafter, the details of the finder visual field frame switching mechanism will be described.

As shown in FIGS. 21 and 22, rectangular top and bottom masks 224 and 225 are provided in the upper and lower parts of a full-size frame 223 of a finder image plane, respectively. As shown in FIG. 23, two cylindrical rotating base end portions 224a and 224a are protrusively formed on a base end portion of the mask 224. Moreover, an upper suspending shaft 228 pierces through the two cylindrical rotating base end portions 224a and 224a along the center axes thereof, which are aligned with each other, and is fitted thereinto in such a manner as to have axial play. Thereby, the mask 224 is supported on the upper suspending shaft 228 in such a way as to rotate thereabout.

Furthermore, each of retreat restraining portions 224b and 224b is formed around the periphery of a corresponding one of the two base end portions 224a and 224a in such a manner as to protrude radially outwardly from the periphery thereof. Additionally, a catch portion 245 for restraining a corresponding one of the retreat restraining portions 224b and 224b from rotating around the shaft, namely, for restraining the top mask 224 from rotating about the shaft is secured to a place on the locus of the rotation of each of the retreat restraining portions 224b and 224b. Further, when the top mask 224 retreats, each of the retreat restraining portions 224b and 224b is put into abutting engagement with the corresponding catch portion 245, so that the retreating position thereof is maintained.

Similarly, rotating base end portions 225a and 225a, each of which has the same shape as of the portion 224a, are protrusively formed on a base end portion of the bottom mask 225. Moreover, a lower suspending shaft 229 pierces through the base end portions 225a and 225a along the center axes thereof, which are aligned with each other, and is fitted thereinto in such a manner as to have axial play. Thereby, the mask 225 is supported on the lower suspending shaft 229 in such a manner as to rotate thereabout.

Furthermore, each of retreat restraining portions 225b and 225b similar to the portions 224b and 224b is formed around the periphery of a corresponding one of the base end portions 225a and 225a in such a manner as to protrude radially outwardly from the periphery thereof. Additionally, a catch portion 245 for restraining a corresponding one of the retreat restraining portions 225b and 225b from rotating around the shaft, namely, for restraining the bottom mask 225 from rotating about the shaft is secured to a place on the locus of the rotation of each of the retreat restraining portions 225b and 225b in the body of the camera. Further, similarly, when the bottom mask 225 retreats, each of the retreat restraining portions 225b and 225b is put into abutting engagement with the corresponding catch portion 245, so that the retreating position thereof is maintained.

Moreover, as illustrated in FIGS. 21 and 22, a coaxial bevel gear 240 (to be described later) is provided at an end of the upper suspending shaft 228 and meshes with a coaxial bevel gear 241 provided at an upper end portion of a left suspending shaft 230. Furthermore, a coaxial bevel gear 236 (to be described later) is provided at the other end portion of the upper suspending shaft 228 and meshes with a coaxial bevel gear 237 provided at an end portion of a right suspending shaft 231.

Additionally, as shown in FIG. 23, a top-mask retreating spring 232 is wound around an end portion of the upper suspending shaft 228. This top-mask retreating spring 232 has an end fixed to the body (not shown) of the camera and the other end which is put on an end portion of the top mask 224 and is operative to always push the top mask 224 in a direction in which this mask retreats.

Moreover, an approaching lever 228a is provided between the rotating base end portion 224a and the bevel gear 236 mounted on the upper suspending shaft 228 in such a manner as to be integral with this shaft and extend from a extending position on this shaft in the direction perpendicular to the longitudinal direction of this shaft. Further, this extending position is determined in such a manner that the lever 228a can be put into abutting engagement with the other end portion of the top mask 224.

Similarly, a bottom-mask retreating spring 233 is wound around an end portion of the lower suspending shaft 229. This bottom-mask retreating spring 233 has an end fixed to the body (not shown) of the camera and the other end which is put on an end portion of the bottom mask 225 and is operative to always push the bottom mask 225 in a direction in which this mask retreats.

Further, a coaxial bevel gear 239 (to be described later) is provided at the other end of the lower suspending shaft 229 and meshes with a coaxial bevel gear 238 provided at the other end of the right suspending shaft 231.

Moreover, an approaching lever 229a is provided between the rotating base end portion 225a and the bevel gear 239 mounted on the lower suspending shaft 229 in such a manner as to be integral with this shaft and extend from an extending position on this shaft in the direction perpendicular to the longitudinal direction of this shaft. Further, this extending position is determined in such a manner that the lever 229a can be put into abutting engagement with the other end portion of the bottom mask 225.

On the other hand, as shown in FIGS. 21 and 22, rectangular left and right masks 226 and 227 are provided in the left and right parts of the full-size frame 223 of the finder image plane, respectively. As shown in FIG. 23, two cylindrical rotating base end portions 227a and 227a are protrusively formed on a base end portion of the right mask 227. Moreover, a right suspending shaft 231 pierces through the two rotating base end portions 227a and 227a along the center axes thereof, which are aligned with each other, are fitted thereinto in such a manner as to have axial play. Thereby, the right mask 227 is supported on the right suspending shaft 231 in such a way as to rotate thereabout.

Furthermore, each of retreat restraining portions 227b and 227b is formed around the periphery of a corresponding one of the two base end portions 227a and 227a in such a manner as to protrude radially outwardly from the periphery thereof as illustrated in FIG. 23. Additionally, a catch portion 245 for restraining a corresponding one of the retreat restraining portions 227b and 227b from rotating around the shaft, namely, for restraining the right mask 227 from rotating about the shaft is secured to a place on the locus of the rotation of each of the retreat restraining portions 227b and 227b. Further, when the right mask 227 retreats, each of the retreat restraining portions 227b and 227b is put into abutting engagement with the corresponding catch portion 245, so that the retreating position thereof is maintained.

Similarly, rotating base end portions 226a and 226a, each of which has the same shape as of the portion 227a, are protrusively formed on a base end portion of the left mask 226. Moreover, a left suspending shaft 230 pierces through the base end portions 226a and 226a along the center axes thereof, which are aligned with each other, and is fitted thereinto in such a manner as to have axial play. Thereby, the left mask 226 is supported on the lower suspending shaft 230 in such a manner as to rotate thereabout.

Furthermore, each of retreat restraining portions 226b and 226b is formed around the periphery of a corresponding one of the two base end portions 226a and 226a in such a manner as to protrude radially outwardly from the periphery thereof. Additionally, a catch portion 245 for restraining a corresponding one of the retreat restraining portions 226b and 226b from rotating around the shaft, namely, for restraining the left mask 226 from rotating about the shaft is secured to a place on the locus of the rotation of each of the retreat restraining portions 226b and 226b in the body of the camera. Further, similarly, when the left mask 226 retreats, each of the retreat restraining portions 226b and 226b is put into abutting engagement with the corresponding catch portion 245, so that the retreating position thereof is maintained.

Approaching levers 230a and 231a respectively extending in the directions perpendicular to the left and right suspending shafts 230 and 231 are formed at positions thereon in such a manner that the levers 230a and 231a are integral with the shafts 230 and 231, respectively, and can be brought into abutting engagement with the left and right masks 226 and 227, respectively. Moreover, a left-mask retreating spring 234 and a right-mask retreating spring 235 are wound around the left suspending shaft 230 and the right suspending shaft 231, respectively. Each of the left-mask retreating spring 234 and the right-mask retreating spring 235 has an end fixed to the body (not shown) of the camera and the other end which is put on an end portion of a corresponding one of the left and right masks 226 and 227 and thereby, is operative to always push the corresponding one of the left and right masks 226 and 227 in the direction in which the corresponding one of these masks retreats.

As stated above, the coaxial bevel gear 240 provided at an end of the upper suspending shaft 228 in such a manner as to be integral therewith meshes with the coaxial bevel gear 241 provided at an end of the left suspending shaft 230 in such a manner as to be integral therewith. Moreover, the coaxial bevel gear 236 is provided at an end portion of the upper suspending shaft 228 on the side of the right mask in such a manner as to be integral with this portion and meshes with the coaxial bevel gear 237 provided at an end portion of the right suspending shaft 231 on the side of the right mask in such a manner as to be integral with this portion. Furthermore, the coaxial bevel gear 238 is provided at the other end portion of the right suspending shaft 231 in such a way as to be integral with therewith and meshes with the coaxial bevel gear 239 provided at the other end portion of the lower suspending shaft 239 in such a way as to be integral therewith.

Further, a gear 242 is provided at a further extended portion of the upper suspending shaft 228, which extends over the bevel gear 236, in such a manner as to be integral with this portion, and meshes with a rack portion 243d of an operating lever 243. An elongated hole 243b is bored in the operating lever 243 and engages with a pair of operating fixing pins 244 secured to the body of the camera, so that this lever can slide in the vertical direction. Moreover, an operating knob 243a for operating the lever with a finger and an elastically deformable click 243c for stopping the operating lever 243 at the visual field frame switching position are formed in the operating lever 243.

Figure 24:
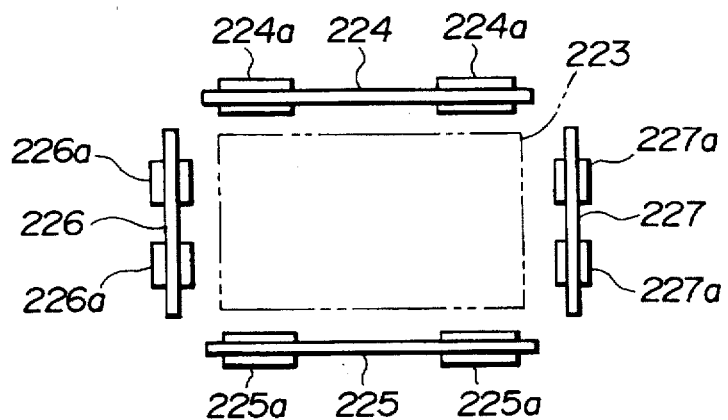
FIGS. 24, 25 and 26 are diagrams for illustrating an operation of the finder visual field frame switching mechanism of the camera, namely, the fifth embodiment.

Next, a switching operation of the finder-visual-field frame switching mechanism of the camera of this fifth embodiment will be described by referring to FIGS. 24 to 26.

Figure 25:
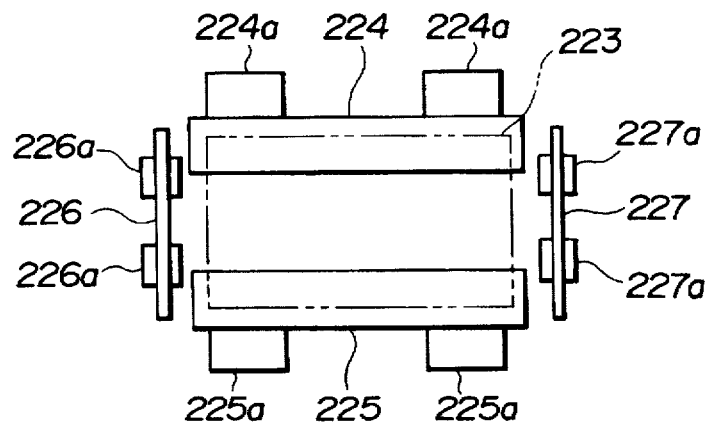
Figure 26:
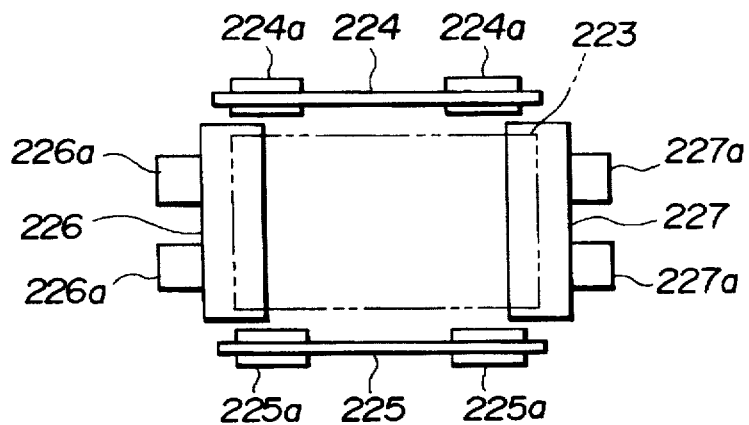

FIG. 25 illustrates the state of a frame obtained by trimming the top and bottom edge portions of the full-size frame 223 by means of the top and bottom masks 224 and 225, similarly as in the cases of the states of FIGS. 21 and 22.

At that time, the operating lever 243 is slid downwardly. The approaching levers 228a and 229a respectively corresponding to the top and bottom masks 224 and 225 push the top and bottom masks 224 and 225 in the trimming directions against the pushing forces of the top-mask retreating spring 232 and the bottom-mask retreating spring 233, respectively.

In contrast, the approaching levers 230a and 231a respectively corresponding to the left and right masks 226 and 227 turn in the directions in which the levers 230a and 231a are separated away from the left and right masks 226 and 227, respectively. Thus, the retreat restraining portions 226b and 227b are put into abutting engagement with the catch portions 245, respectively, by the pushing forces of the left mask retreating spring 234 and the right mask retreating spring 235, and the left and right masks 226 and 227 are held at the retreating positions.

As the operating lever 243 is slid upwardly from the position or state of FIG. 25, the approaching levers 228a and 229a rotate and retreat. The top and bottom masks 224 and 225 are turned and retreated by the pushing forces of the top-mask retreating spring 232 and the bottom-mask retreating spring 233. Further, the approaching levers 228a, 229a, 230a and 231a are put into a state in which these levers do not push the four masks 224, 225, 226 and 227. At that time, the entire full-size frame 223 is uncovered as illustrated in FIG. 24 and the mechanism is brought into the full-size state.

Moreover, if the operating lever 243 is slid further upwardly, the approaching levers 228a and 229a are separated further away from the top mask 224 and the bottom mask 225, respectively. In contrast, the approaching levers 230a and 231a push the left mask 226 and the right mask 227, respectively. Thereby, the left and right edge portions of the image plane are trimmed or cropped, as shown in FIG. 26.

In the case of such a fifth embodiment, the four masks, namely, the top, bottom, left and right masks rotate and retreat. Moreover, these masks can retreat from the full-size frame 223 in the direction perpendicular to the surface of the frame 223. Thus, a space required for treating the masks becomes small. Consequently, a smaller camera can be provided.

Incidentally, in the case of this embodiment, each of the retreat restraining members or portions are formed in such a manner as to be integral with the corresponding mask. The masks, however, may be retreated until the masks are not in abutting engagement with other components of the camera. Furthermore, an angle, at which the mask is retreated, is not necessarily a right angle to the full-size frame 223.

Figure 27:
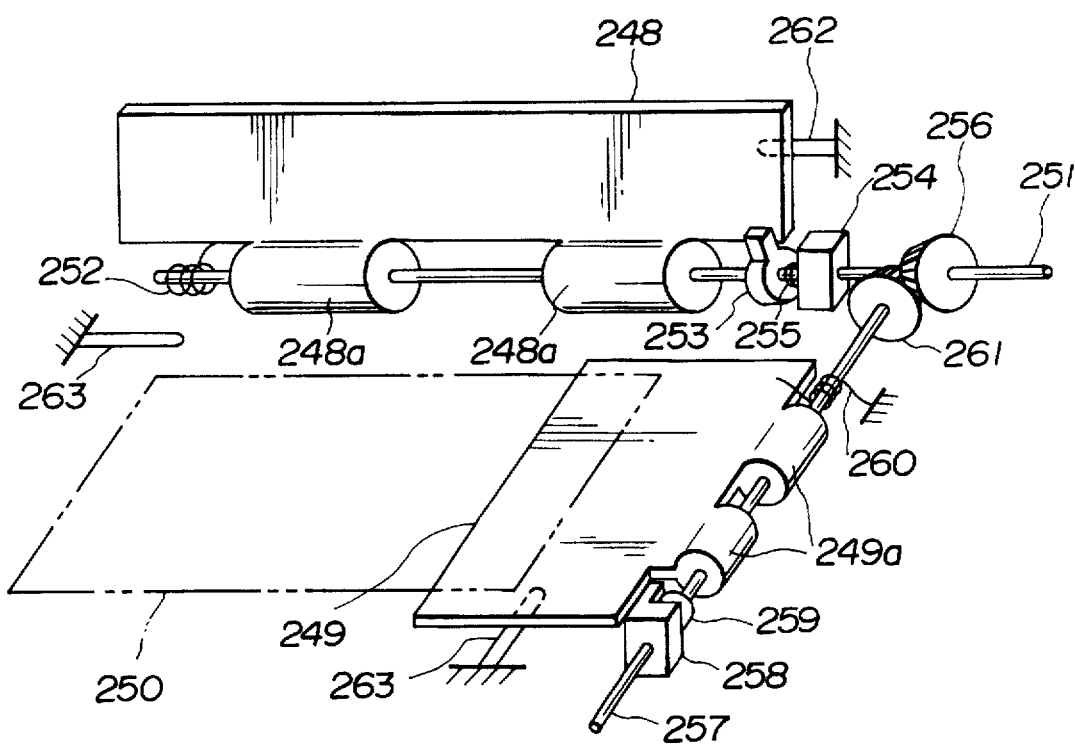
FIG. 27 is a perspective diagram for illustrating a primary portion of a finder visual field frame switching mechanism of a camera which is a sixth embodiment of the present invention.
Figure 28:
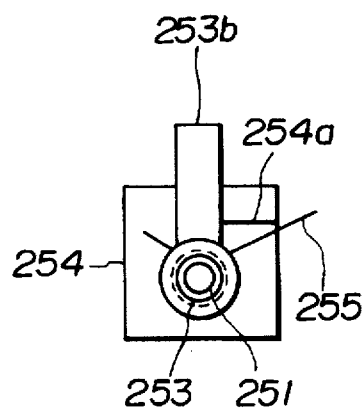
FIG. 28 is a front view of a top-mask retreating lever and a retreating-lever restraining portion of the camera, namely, the sixth embodiment, which is taken in the direction of a suspending shaft thereof.
Figure 29:
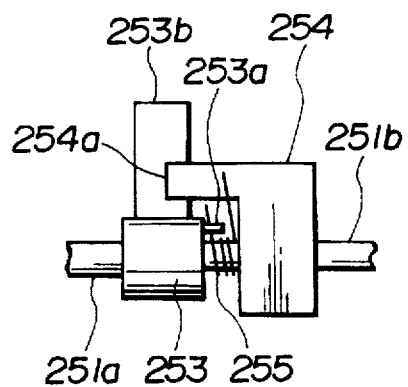
FIG. 29 is a side view of the top-mask retreating lever and the retreating-lever restraining portion of the camera, namely, the sixth embodiment, which is taken in a transverse direction of a suspending shaft thereof.
Figure 30:
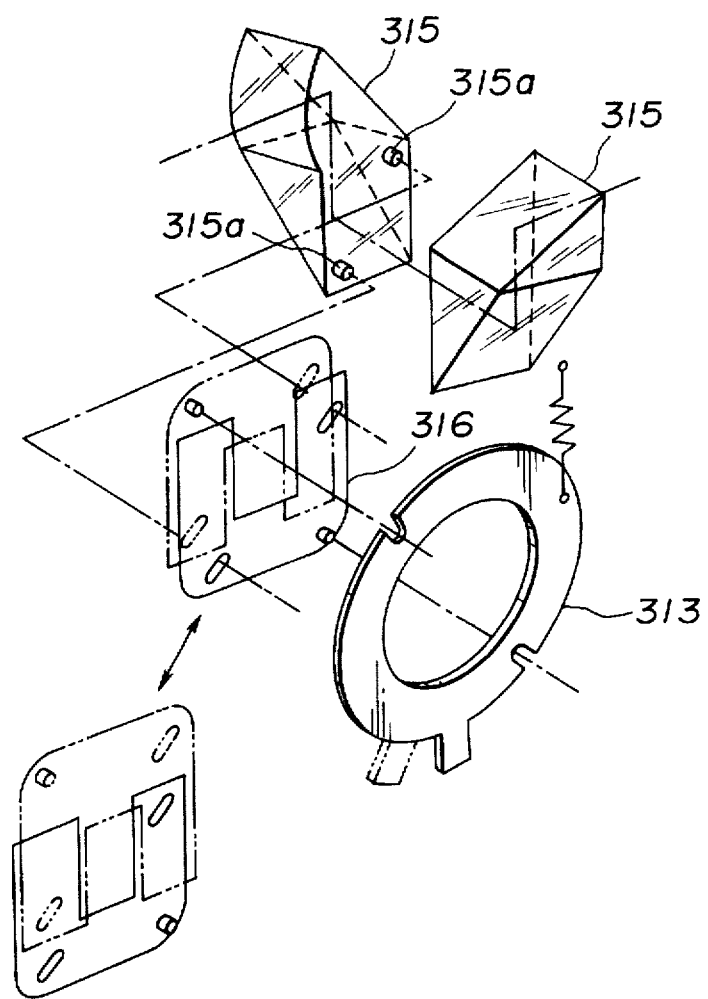
FIG. 30 is a perspective view of a conventional finder visual field frame switching mechanism.

FIGS. 27 to 29 illustrate a sixth embodiment of the present invention. FIG. 27 is a perspective diagram for illustrating a primary portion of a finder visual field frame switching mechanism of a camera.

The primary components of the camera of this sixth embodiment are substantially similar to those of the first embodiment. Further, the primary components of the finder visual field frame switching mechanism of the sixth embodiment are similar to those of the finder visual field frame switching mechanism of the fifth embodiment. Therefore, only the components of the sixth embodiment, which are different from the corresponding components of the fifth embodiment, will be described hereinbelow.

FIG. 27 illustrates a state in which the top mask 248 is at the retreating position and the right mask 249 is put into abutting engagement with a restraining member 263 and is at the trimming position.

The top mask 248 and the right mask 249 are adapted to perform functions similar to those of the top mask 224 and the right mask 227, respectively. Further, the top mask 248 and the right mask 249 are always pushed by a top-mask spring 252 and a right-mask spring 260 in the directions in which a full-size frame 250 is trimmed.

Pairs 248a and 249a of the rotating base end portions similar to those of the fifth embodiment are formed on the top mask 248 and the right mask 249, respectively. Each of an upper suspending shaft 251 and a right suspending shaft 257 pierces through a corresponding one of the pairs 248a and 249a of the rotating base end portions along the center axes thereof and is fitted thereinto in such a manner as to have axial play.

Each of the top-mask retreating lever 253 and the right-mask retreating lever 259 is supported on an end portion of a corresponding one of the suspending shafts 251 and 257 in such a way as to rotate thereabout. Moreover, retreat restraining portions 254 and 258, which are respectively used to restrict the positions (namely, inhibit the rotations) of the top-mask retreating lever 253 and the right-mask retreating lever 259, are formed in the suspending shafts 251 and 257 in such a way as to be integral therewith. Furthermore, coaxial bevel gears 256 and 261 are provided at end portions of the suspending shafts 251 and 257, respectively, and mesh with each other.

Next, the details of the top-mask retreating lever 253, the right-mask retreating lever 259 and the retreat lever restraining portions 254 and 258 will be described hereinbelow.

FIG. 28 is a front view of the top-mask retreating lever 253 and the retreating-lever restraining portion 254 of the camera, namely, the sixth embodiment, which is taken in the direction of the suspending shaft 251 thereof.

FIG. 29 is a side view of the top-mask retreating lever 253 and the retreating-lever restraining portion 254 of the camera, namely, the sixth embodiment, which is taken in a transverse direction of the suspending shaft 251 thereof.

A small-diameter portion 251b of the suspending shaft 251 is fitted into the top-mask retreating lever 253 in such a manner as to have axial play and the lever 253 is in abutting engagement with a large-diameter portion 251a of shaft 251 so as to be prevented from moving the left side of FIG. 29, namely, to the rotating base end portion 248a of the top mask 248. A catch portion 253b is formed on the periphery of the top-mask retreating lever 253 in such a way as to outwardly protrude therefrom. Further, a spring pin 253a is formed on the base end portion of the top-mask retreating lever 253 and extends toward the retreating-lever restraining portion 254.

The aforementioned retreating-lever restraining portion 254 is fixed to the suspending shaft 251. A projection portion 254a is formed on a leading end portion of the portion 254 in such a manner as to project therefrom onto the locus of the rotation of the catch portion 253b of the top-mask retreating lever 253. Thereby, the top-mask retreating lever 253 is restrained by the projection portion 254a from turning.

A retreating lever spring 255 is provided between the base end portion of the top-mask retreating lever 253 and the projection portion 254a, and has an end put on the spring pin 253a of the top-mask retreating lever 253 and the other end put on the projection portion 254a of the retreating-lever restraining portion 254. The top-mask retreating lever 253 is always pushed by the retreating lever spring 255 in the direction in which the lever 253 is brought into abutting engagement with the portion 254a.

Incidentally, the pushing force of the retreating lever spring 255 is stronger than that of the top-mask spring 252. Namely, the top-mask retreating lever 253 and the retreating-lever restraining portion 254 are rotated by the retreating lever spring 255 as one piece.

Next, a switching operation of the mask will be described hereinbelow.

As shown in FIG. 27, the top mask 248 is pushed up by the top mask retreating lever 253 against the pushing force of the top-mask spring 252 and stops at a position where the mask 248 is in abutting engagement with a mask lock 262.

When the mask 248 is locked, the rotation of the top-mask retreating lever 253 is restrained. In contrast, the suspending shaft 251 and the retreating-lever restraining portion 254, formed in such a manner to be integral with the shaft 251, turn by 90° excessively (namely, have what is called an excessive stroke). The right-mask retreating lever 259 and the retreat lever restraining portion 258 mounted on the suspending shaft 257 are turned to the trimming position as a result of this excessive stroke. Consequently, the right mask 249 is moved by the right mask spring 260 to engage the restraining member 263 at the trimming position.

In contrast, if the suspending shaft 257 is reversed, the right mask 249 is brought by the right-mask retreating lever 259 into abutting engagement with a mask lock (not shown) for the right mask. At that time, the top mask 248 is also at the retreating position. Thus the mechanism is put into a state in which both of the masks retreat, namely, into the full-size state. If further turned in the same direction, the top mask 248 is moved to the trimming position restraining member 263. Thus the right mask 249 holds the retreating position.

In the case of such a sixth embodiment, the left and right masks retreat when the top and bottom masks for trimming the top and bottom edge portions of the full-size frame is driven. Conversely, the top and bottom masks retreat when the left and right masks are driven. Thus, the present invention can provide a camera, by which a subject is easily seen through a finder without striking a user as incongruous even if a mask switching operation is performed.

Moreover, in the case of this embodiment, when trimming the top and bottom edge portions, the top and bottom masks are put into the trimming state when the left and right masks are retreated. In contrast, when trimming the left and right edge portions, the left and right masks are put into the trimming state when the top and bottom masks are retreated. Thus the masks can be prevented from colliding with each other. Moreover, a space required for treating the masks can be reduced to a small space. Consequently, a smaller camera can be provided.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A camera adapted to set an aspect ratio of a photographic image plane and further record information representing a set aspect ratio on a recording medium provided upon film, comprising:

first mask means placed in a stationary position in said camera for defining an observable image plane size of a finder image plane corresponding to a photographing image plane;

second mask means movable relative to said first mask means for performing a vertical trimming on the finder image plane;

third mask means movable relative to said first mask means for performing a lateral trimming on the finder image plane;

said second and third mask means being movable relative to one another; and switching means for switching a state of a visual field range on the finder image plane among a plurality of states respectively corresponding to different aspect ratios by selectively moving the second mask means and the third mask means, said switching means having a first switching state wherein said second and third mask means are moved relative to said first mask means to a second mask means displaced position and a third mask means displaced position displaced from the first mask means to prevent vertical and lateral trimming of said first image plane size; a second switching state wherein said second mask means is moved relative to first mask means the second mask means displaced position to prevent vertical trimming of said first mask means and said third mask means is moved relative said first mask means to a third mask means trimming position for laterally trimming said first image plane size; and a third switching state wherein said third mask means is moved relative to the first mask means to the third mask means displaced position to prevent lateral trimming of said first mask means and said second mask means is moved relative to said first mask means to the second mask means trimming position for vertically trimming said first mask means.

2. The camera according to claim 1, wherein the second mask means comprises two movable masks for trimming top and bottom portions of the finder image plane.

3. The camera according to claim 1, wherein the third mask means comprises two masks for trimming left and right portions of the finder image plane.

4. The camera according to claim 1, wherein the third mask means comprises a one-piece, fork-like mask, for trimming left and right portions of the finder image plane.

5. The camera according to claim 1, wherein the second mask means comprises a one-piece, fork-like mask, for trimming top and bottom portions of the finder image plane.

6. A camera adapted to set an aspect ratio of a photographic image plane and further record information representing a set aspect ratio on a recording medium provided upon film, comprising:

first mask means for defining an observable finder image plane corresponding to a photographing image plane;

second mask means for performing a vertical trimming on the finder image plane;

third mask means for performing a lateral trimming on the finder image plane;

switching means for switching a state of a visual field range on the finder image plane among a plurality of states respectively corresponding to different aspect ratios by moving the second mask means and the third mask means;

said second mask means comprising two masks for trimming top and bottom portions of the finder image plane;

said switching means comprising first cam means for driving the two masks of the second mask means to move to second mask means trimming positions for trimming the top and bottom portions of the finder image plane and to second mask means retreating positions for retreating the second mask means from the finder image plane.

7. The camera according to claim 6, wherein the third mask means comprises two masks trimming left and right portions of the finder image plane; and said switching means further comprises second cam means for driving the two masks of the third mask means to move to trimming positions for trimming left and right portions of the finder image plane and to retreating positions for retreating the third mask means from the finder image plane.

8. The camera according to claim 7, wherein at least one of the first cam means and second cam means is formed on a periphery of a cylindrical member which is adapted to rotate about an axis substantially parallel to a lateral direction of the finder image plane.

9. The camera according to claim 8 wherein at least one of the second mask means and the third mask means is guided along a guide shaft extending substantially in parallel with the cylindrical member.

10. The camera according to claim 9, wherein at least one of the second mask means and the third mask means is moved in a direction in which the guide shaft extends.

11. The camera according to claim 7, wherein the first cam means and second cam means are formed on a periphery of a cylindrical member which is adapted to rotate about an axis substantially parallel to a vertical direction of the finder image plane.

12. The camera according to claim 11, wherein the second mask means and the third mask means are guided along a guide shaft extending substantially parallel with the cylindrical member.

13. The camera according to claim 12, wherein the second mask means and the third mask means are moved in a direction in which the guide shaft extends.

14. The camera according to claim 6, wherein the third mask means is driven to move to a third mask means retreating position when the second mask means is driven to move to the second mask means trimming position.

15. The camera according to claim 6, wherein the second mask means is driven to move to the second mask means retreating position when the third mask means is driven to move to a third mask means trimming position.

16. A camera adapted to set an aspect ratio of a photographic image plane and further record information representing an aspect ratio on a recording medium provided upon film, comprising:

first mask means for defining an observable image plane size of a finder image plane corresponding to a photographing image plane;

second mask means for performing a vertical trimming on the finder image plane;

third mask means for performing a lateral trimming on the finder image plane;

switching means for switching a state of a visual field range on the finder image plane among a plurality of states respectively corresponding to different aspect ratios by selectively moving the second mask means and the third mask means;

said third mask means comprising two masks for trimming left and right positions of the finder image plane;

said switching means comprising cam means for driving the two masks of the third mask means to move to third mask means trimming positions for trimming the left and right portions of the finder image plane and to third mask means retreating positions for retreating the third mask means from the finder image plane.

17. The camera according to claim 16, wherein said cam means is formed on a periphery of a cylindrical member which is adapted to rotate about an axis substantially parallel to a lateral direction of the finder image plane.

18. The camera according to claim 17, wherein the second mask means and the third mask means are guided along a guide shaft extending substantially parallel with the cylindrical member.

19. The camera according to claim 18, wherein the second mask means and the third mask means are moved in a direction in which the guide shaft extends.

20. The camera according to claim 16, wherein said cam means is formed on a periphery of a cylindrical member which is adapted to rotate about an axis substantially parallel to a vertical direction of the finder image plane.

21. The camera according to claim 20, wherein the second mask means and the third mask means are guided along a guide shaft extending substantially parallel with the cylindrical member.

22. The camera according to claim 21, wherein the second mask means and the third mask means are moved in a direction in which the guide shaft extends.

23. The camera according to claim 16, wherein the two masks of the third mask means are driven to move to the third mask means retreating positions when the second mask means is driven to move to a second mask means trimming position.

24. The camera according to claim 16, wherein the second mask mean is driven to move to a second mask means retreating position when the masks of the third mask means are driven to move to the third mask means trimming position.

25. A camera adapted to set an aspect ratio of a photographic image plane and further record information representing an aspect ratio on a recording medium provided upon film, comprising:

first mask means for defining an observable image plane size of a finder image plane corresponding to a photographing image plane;

second mask means for performing a vertical trimming on the finder image plane;

third mask means for performing a lateral trimming on the finder image plane;

switching means for switching a state of a visual field range on the finder image plane among a plurality of states respectively corresponding to different aspect ratios by selectively moving the second mask means and the third mask means; and said third mask means comprising a one-piece, fork-like mask for trimming left and right portions of the finder image plane;

said switching means comprising cam means for driving the third mask means to move to a third mask means trimming position for trimming the left and right portions of the finder image plane and to a third mask means retreating position for retreating the third mask means from the finder image plane.

26. The camera according to claim 25, wherein said switching means further comprises first cam means for driving the second mask means to move to trimming positions for trimming top and bottom portions of the finder image plane and to retreating positions for retreating the second mask means from the finder image plane.

27. The camera according to claim 26, wherein at least one of the first cam means and second cam means is formed on a periphery of a cylindrical member which is adapted to rotate on a shaft parallel to a lateral direction of the finder image plane.

28. The camera according to claim 27, wherein at least one of the second mask means and the third mask means are guided along a guide shaft extending substantially parallel with the cylindrical member.

29. The camera according to claim 28, wherein at least one of the second mask means and the third mask means are moved in a direction in which the guide shaft extends.

30. The camera according to claim 25, wherein said cam means is formed on a periphery of a cylindrical member which is adapted to rotate about an axis substantially parallel to a vertical direction of the finder image plane.

31. The camera according to claim 30, wherein the second mask means and the third mask means are guided along a guide shaft extending almost in parallel with the cylindrical member.

32. The camera according to claim 31, wherein the second mask means and the third mask means are moved in a direction in which the guide shaft extends.

33. The camera according to claim 25, wherein the third mask means is driven to move to the third mask means retreating position when the second mask means is driven to move to a second mask means trimming position.

34. The camera according to claim 25, wherein the second mask means is driven to move to a second mask means retreating position when the third mask means is driven to move to the third mask means trimming position.

35. A camera adapted to set an aspect ratio of a photographic image plane and further record information representing an aspect ratio on a recording medium provided upon film, comprising:

first mask means for defining an observable finder image plane size of a finder image plane corresponding to a photographing image plane;

second mask means for performing a vertical trimming on the finder image plane;

third mask means for performing a lateral trimming on the finder image plane;

switching means for switching a state of a visual field range on the finder image plane among a plurality of states respectively corresponding to different aspect ratios by selectively moving the second mask means and the third mask means;

said second mask means comprising a one-piece, fork-like mask, for trimming top and bottom portions of the finder image plane;

said switching means comprising first cam means for driving the second mask means to move to a second mask means trimming position for trimming top and bottom portions of the finder image plane and to a second mask means retreating position for retreating the third mask means from the finder image plane.

36. The camera according to claim 35, wherein the switching means comprises first cam means for driving the third mask means to move to trimming positions for trimming left and right portions of the finder image plane and to retreating positions for retreating the third mask means from the finder image plane.

37. The camera according to claim 36, wherein at least one of the first cam means and second cam means is formed on a periphery of a cylindrical member which is adapted to rotate about an axis substantially parallel to a lateral direction of the finder image plane.

38. The camera according to claim 37, wherein at least one of the second mask means and the third mask means is guided along a guide shaft extending substantially parallel with the cylindrical member.

39. The camera according to claim 38, wherein at least one of the second mask means and the third mask means is moved in a direction in which the guide shaft extends.

40. The camera according to claim 36 wherein the first cam means and second cam means are formed on a periphery of a cylindrical member which is adapted to rotate about an axis substantially parallel to a vertical direction of the finder image plane.

41. The camera according to claim 40, wherein the second mask means and the third mask means are guided along a guide shaft extending substantially parallel with the cylindrical member.

42. The camera according to claim 41, wherein the second mask means and the third mask means are moved in a direction in which the guide shaft extends.

43. The camera according to claim 35, wherein the third mask means is driven to move to a third mask means retreating position when the second mask means is driven to move to the second mask means trimming position.

44. The camera according to claim 35, wherein the second mask mean is driven to move to the second mask means retreating position when the third mask means is driven to move to a third mask means trimming position.

45. A camera adapted to set an aspect ratio of a photographic image plane and further record information representing the set aspect ratio on a recording medium provided upon film, comprising:

first mask means located at a fixed position in the camera for defining an observable finder image plane size corresponding to a photographing image plane;

second mask means movable relative to said first mask means for performing a vertical trimming on the finder image plane;

third mask means movable relative to said first mask means for performing a lateral trimming on the finder image plane;

said second and third mask means being moveable relative to one and other; and a driving unit for moving the second and third mask means and having at least two states, wherein the third mask means is moved to a third mask means trimming position for trimming left and right portions of the finder image plane and the second mask means retreats from a second mask means trimming position for trimming top and bottom portions of the finder image to a second mask means retreat position in a first state and, wherein the second mask means is moved to a second mask means trimming position for trimming top and bottom portions of the finder image plane and the third mask means retreats from the third mask means trimming position for trimming left and right portions of the finder image to a third mask means retreat position in a second state.

46. The camera according to claim 45, which further comprises defining means for defining second mask means and third mask means retreat positions to which the second mask means and the third mask means respectively retreat.

47. A camera adapted to set an aspect ratio of a photographic image plane and further record information representing a set aspect ratio on a recording medium provided upon film, comprising:

first mask means located at a fixed position in the camera for defining an observable finder image plane size corresponding to a photographing image plane;

second mask means movable relative to said first mask means for performing a vertical trimming on the finder image plane;

third mask means movable relative to said first mask means for performing a lateral trimming on the finder image plane;

said second and third mask means being movable relative to one and other;

pushing means for pushing the second mask means and the third mask means in directions which the second mask means and the third mask means respectively retreat from the finder image plane so a second mask means retreat position and a third mask means retreat position to prevent both vertical and lateral trimming; and driving means for allowing the third mask means to retreat from the finder image plane when the second mask means trims top and bottom portions of the finder image plane and for allowing the second mask means to retreat from the finder image plane when the third mask means trims left and right portions of the finder image plane.

48. The camera according to claim 47, which further comprises defining means for defining second mask means retreat position and third mask means retreat positions to which the second mask means and the third mask means respectively retreat.

49. A camera adapted to set an aspect ratio of a photographic image plane and further record information representing a set aspect ratio on a recording medium provided upon film, comprising:

first mask means located at a fixed position in the camera for defining an observable finder image plane size corresponding to a photographing image plane;

second mask means movable relative to said first mask means for performing a vertical trimming on the finder image plane;

third mask means movable relative to said first mask means for performing a lateral trimming on the finder image plane;

said second and third mask means being movable relative to one and other;

holding means for holding the third mask means at a retreating position to prevent lateral trimming allowing the second mask means to move to a vertical trimming position and for holding the second mask means at a retreating position to prevent vertical trimming and allowing the third mask means to move to a lateral trimming position.

50. The camera according to claim 49, which further comprises defining means for defining lateral trimming positions of the second mask means and for defining vertical trimming positions the third mask means.

51. A camera for setting an aspect ratio of a photographic image plane and further record information representing a set aspect ratio on a recording medium provided upon film, comprising:

first mask means for defining an observable finder image plane size corresponding to a photographing image plane;

second mask means movable along a line transverse to a side of the first mask means and toward the first mask means to a second mask means trimming position at which the second mask means performs a vertical trimming on the finder image plane, and movable along said line and away from said first mask for retreating from the first mask means to a second mask means retreating position to prevent vertical trimming;

third mask means for moving along a second line perpendicular to said first line toward the first mask means to a third mask means trimming position at which the third mask means performs a lateral trimming on the finder image plane, and along said second line and away from said first mask for retreating from the first mask means to a third mask means retreating position to prevent lateral trimming; and holding means for holding the third mask means at the third mask means retreating position when allowing the second mask means to move to the second mask means trimming position and for holding the second mask means at the second mask means retreating position when allowing the third mask means to move to the third mask means trimming position.

52. A camera adapted to record information, which is used for performing a trimming operation on a photographic image plane of a first size, on a recording medium provided upon a film, comprising:

aspect ratio setting means for setting an aspect ratio of the photographic image plane;

aspect ratio information recording means for recording aspect ratio information, which represents an aspect ratio set by the aspect ratio setting means, on the recording medium;

first mask means movable relative to a finder image plane for performing a vertical trimming on the finder image plane;

second mask means movable relative to said finder image plane for performing a lateral trimming on the finder image plane; and said first and second mask means being movable relative to one and other;

finder-image-plane switching means for switching positions of the first mask means and the second mask means between a first mask means trimming position and a second mask means trimming position, at which a trimming operation is performed, and a first mask means retreating position at which a trimming operation is not performed, wherein in a case where one of the first and second mask means is moved to its associated trimming position, the finder-image-plane switching means includes means which moves the other of the first and second mask means to its associated retreating position.

53. A camera adapted to record information, which is used for performing a trimming operation on a photographic image plane, on a recording medium provided upon a film, comprising:

first mask means having a pair of mask plates movable to first mask means trimming positions, at which a vertical trimming is performed on a finder image plane, and to first mask means retreating positions at which a trimming is not performed on the finder image plane;

second mask means having a pair of mask plates movable to second mask means trimming positions, at which a lateral trimming is performed on the finder image plane, and to second mask means retreating positions where a trimming is not performed on the finder image plane; and finder-image-plane switching means for switching a state of the finder image plane among a first state in which the mask plates of the first mask means are moved apart and the mask plates of the second mask means are moved apart to their respective first and second mask means retreating positions, a second state in which the mask plates of first mask means are moved toward one another to the first mask means trimming positions and the second mask means is at the second mask means retreating positions, and a third state in which the first mask means is at the first mask means retreating positions and the mask plates of the second mask means are moved toward one and other to the second mask means trimming positions.

54. A camera adapted to record information, which is used for performing a trimming operation on a photographic image plane, on a recording medium provided upon a film, comprising:

first mask means having a pair of mask plates movable to first mask means trimming positions, at which a vertical trimming is performed on a finder image plane, and to first mask means retreating positions at which a trimming is not performed on the finder image plane;

second mask means having a pair of mask plates movable to second mask means trimming positions, at which a lateral trimming is performed on the finder image plane, and to second mask means retreating positions where a trimming is not performed on the finder image plane; and finder-image-plane switching means for switching a state of the binder image plane among a first state in which the mask plates of the first mask means are moved apart and the mask plates of the second mask means are moved apart to their respective first and second mask means retreating positions, a second state in which the mask plates of first mask means are moved toward one another to a the first mask means trimming positions and the second mask means is at the second mask means retreating positions, and a third state in which the first mask means is at the first mask means retreating positions and the mask plates of the second mask means are moved toward one and other to the second mask means trimming positions;

said finder-image-plane switching means comprising:

first interlocking means for moving the first mask means, consisting of a pair of mask plates, which are interlocked, to the first mask means trimming positions or the first mask means retreating positions;

second interlocking means for moving the second mask means, consisting of a pair of mask plates, which are interlocked, to the second mask means trimming positions or the second mask means retreating positions; and cam means, engaged with one of the mask plates of the first mask means and one of the mask plates of the second mask means, for selectively driving one of the first and second mask means.

55. A camera adapted to record information, which is used for performing a trimming operation on a photographic image plane, on a recording medium provided upon a film, comprising:

first mask means having a pair of mask plates movable to first mask means trimming positions, at which a vertical trimming is performed on a finder image plane, and to first mask means retreating positions at which a trimming is hot performed on the finder image plane;

second mask means having a pair of mask plates movable to second mask means trimming positions, at which a lateral trimming is performed on the finder image plane, and to second mask means retreating positions where a trimming is not performed on the finder image plane; and finder-image-plane switching means for switching a state of the finder image plane among a first state in which the mask plates of the first mask means are moved apart and the mask plates of the second mask means are moved apart to their respective first and second mask means retreating positions, a second state in which the mask plates of the first mask means are moved toward one another to the first mask means trimming positions and the second mask means is at the second mask means retreating positions, and a third state in which the first mask means is at the first mask means retreating positions and the mask plates of the second mask means are moved toward one and other to the second mask means trimming positions;

said finder-image-plane switching means comprising:

first cam means, engaged with one of the mask plates of a pair of plates contained in the first mask means and one of the mask plates of a pair of plates contained in the second mask means, for selectively driving one of the mask plates engaged with the first cam means;

second cam means, engaged with the other of the mask plates of the pair contained in the first mask means and the other of the mask plates of the pair contained in the second mask means, for selectively driving one of the mask plates engaged with the second cam means;

first pushing means for pushing one of the mask plates of the first mask means containing the pair of the mask plates in a given direction, in which the pushed one of the mask plates of the first mask means is put into abutting engagement with the first cam means, and for pushing the other of the mask plates of the first mask means containing the pair of the mask plates in a given direction, in which the other of the pushed mask plates of the first mask means is put into abutting engagement with the second cam means; and second pushing means for pushing one of the mask plates of the second mask means containing the pair of the mask plates in a given direction, in which the pushed one of the mask plates of the second mask means is put into abutting engagement with the second cam means, and for pushing the other of the mask plates of the second mask means containing the pair of the mask plates in a given direction, in which the other of the pushed mask plates of the second mask means is put into abutting engagement with the first cam means.

56. A camera adapted to record information, which is used for performing a trimming operation on photographic image plane, on a recording medium provided upon a film, comprising:

first mask means having a pair of mask plates movable to first mask means trimming positions, at which a vertical trimming is performed on a finder image plane, and to first mask means retreating positions at which a trimming is not performed on the finder image plane;

second mask means having a pair of mask plates movable to second mask means trimming positions, at which a lateral trimming is performed on the finder image plane, and to a second mask means retreating positions where a trimming is not performed on the finder image plane;

third mask means located in a fixed position in the camera for forming a finder visual field corresponding to a full-size photographing image plane; and finder-image-plane switching means for switching a state of the finder image plane among a first state in which the mask plates of the first mask means are moved apart and the mask plates of the second mask means are moved apart to their respective first and second mask means retreating positions with respect to the third mask means, a second state in which mask plates of the first mask means are moved toward one and other to the first mask means trimming positions and the second mask means is at the second mask means retreating positions with respect to the third mask means, and a third state in which the first mask means is at the first mask means retreating positions and the mask plates of the second mask means are moved toward one and other to the second mask means trimming positions with respect to the third mask means.

57. The camera according to claim 56, wherein the finder-image-plane switching means comprises:

first interlocking means for moving the first mask means consisting of the pair of the interlocked mask plates to the first mask means trimming position or the first mask means retreating position;

second interlocking means for moving the second mask means consisting of the pair of the interlocked mask plates to the second mask means trimming position or the second mask means retreating position; and cam means, engaged with one of the mask plates of the first mask means and one of the mask plates of the second mask means, for selectively driving one of the first and second mask means.

58. A camera adapted to record information, which is used for performing a trimming operation on photographic image plane, on a recording medium provided upon a film, comprising:

first mask means having a pair of mask plates movable to first mask means trimming positions, at which a vertical trimming is performed on a finder image plane, and to first mask means retreating positions at which a trimming is not performed on the finder image plane;

second mask means having a pair of mask plates movable to second mask means trimming positions, at which a lateral trimming is performed on the finder image plane, and to second mask means retreating positions where a trimming is not performed on the finder image plane;

third mask means for forming a finder visual field corresponding to a full-size photographing image plane; and finder-image-plane switching means for switching a state of the finder image plane among a first state in which the mask plates of the first mask means and the mask plates of the second mask means are moved to their respective first and second mask means retreating positions with respect to the third mask means, a second state in which mask plates of the first mask means are moved to the first mask means trimming positions and the second mask means is at the second mask means retreating positions with respect to the third mask means, and a third state in which the first mask means is at the first mask means retreating positions and the mask plates of the second mask means are moved to the second mask means trimming positions with respect to the third mask means;

said finder-image-plane switching means comprising:

first cam means, engaged with one of the mask plates of the pair contained in the first mask means and one of the mask plates of the pair contained in the second mask means, for selectively driving one of the mask plates engaged with the first cam means;

second cam means, engaged with the other of the mask plates of the pair contained in the first mask means and the other of the mask plates of the pair contained in the second mask means, for selectively driving one of the mask plates engaged with the second cam means;

first pushing means for pushing one of the mask plates of the first mask means containing the pair of the mask plates in a given direction, in which the pushed one of the mask plates of the first mask means is put into abutting engagement with the first cam means, and for pushing the other of the mask plates of the first mask means containing the pair of the mask plates in a given direction, in which the other of the pushed mask plates of the first mask means is put into abutting engagement with the second cam means; and second pushing means for pushing one of the mask plates of the second mask means containing the pair of the mask plates in a given direction, in which the pushed one of the mask plates of the second mask means is put into abutting engagement with the second cam means, and for pushing the other of the mask plates of the second mask means containing the pair of the mask plates in a given direction, in which the other of the pushed mask plates of the second mask means is put into abutting engagement with the first cam means.

59. A camera adapted to record information, which is used for performing a trimming operation on a photographic image plane, on an information recording medium, comprising:

visual-field-frame switching means for switching a state of a finder visual field frame among a first state in which the finder visual field frame has a full-size photographing image plane by respectively moving vertical and lateral trimming means away from the image plane to vertical and lateral displaced positions, a second state in which a vertical trimming is performed on the full-size photographing image plane by moving the vertical trimming means relative to said image plane and said lateral trimming means to a vertical trimming means position, and a third state in which a lateral trimming is performed on the full-size photographing image plane by moving the lateral trimming means relative to said image plane and said vertical trimming means to a lateral trimming means state, wherein the visual-field-frame switching means causes the finder visual field frame to move to the first state when the state of finder visual field frame is switched from the second state to the third state, and when the state of finder visual field frame is switched from the third state to the second state.

60. A camera adapted to record information, which is used for performing a trimming operation on a photographic image plane, on an information recording medium, comprising:

a first movable mask for performing a vertical trimming on a finder visual field frame;

a second movable mask for performing a lateral trimming on a finder visual field frame;

said first and second mask being movable relative to one and other;

visual-field-frame switching means for switching a state of a finder visual field frame among a first state in which the first and second masks are respectively moved to first and second mask retreating positions where no trimming is performed, a second stage in which only the first mask is moved to a first mask trimming position and the second mask is moved to the second mask retreating position and a third state in which the first mask moved to the first mask retreating position and the second mask is moved to a second mask trimming position, wherein the visual-field-frame switching means causes a state of the finder visual field frame to move to the first state when the state of the finder visual field frame is switched from the second state to the third state, and when the state of the finder visual field frame is switched from the third state to the second state.

61. A camera adapted to record information, which is used for performing a trimming operation on a photographic image plane, on an information recording medium, comprising:

a first mask for performing a vertical trimming on a finder visual field frame;

a second mask for performing a lateral trimming on a finder visual field frame;

a third mask for forming a finder visual field frame corresponding to a full-size photographing image plane;

said first and second masks being movable relative to said third mask and relative to each other;

visual-field-frame switching means for switching a state of a finder visual field from among a first state in which both of the first and second masks are respectively moved to first mask and second mask retreating positions, where no trimming is performed, with respect to the third mask, a second state in which the first mask is moved to a first mask trimming position and the second mask is at the second mask retreating position with respect to the third mask, and a third state in which the first mask is at the first mask retreating position and the second mask is moved to a second mask trimming position with respect to the third mask, wherein the visual-field-frame switching means causes the state of the finder visual field frame to move to the first state when the state of finder visual field frame is switched from the second state to the third state, and when the state of finder visual field frame is switched from the third state to the second state.

* * * * *

UNITED STATES PATENT AND TRADEMARK OFFICE
CERTIFICATE OF CORRECTION

PATENT NO. : 5,732,297
DATED : March 24, 1998
INVENTOR(S) : Nobuyuki Tanaka, et al It is certified that error appears in the above-identified patent and that said Letters Patent is hereby corrected as shown below:

Column 5, line 64, after "33", insert --34--
Column 8, line 57, before"camgrooves", insert --left hand and right hand--.
Column 8, line 58, delete "left hand and right hand".
Column 14, line 4, delete "into" insert --to receive--.
Column 30, line 23, delete "hot" insert --not--.

Signed and Sealed this

Nineteenth Day of December, 2000

Attest:

Q. TODD DICKINSON

Attesting Officer

Commissioner of Patents and Trademarks

UNITED STATES PATENT AND TRADEMARK OFFICE
CERTIFICATE OF CORRECTION

PATENT NO.     : 5,732,297
DATED          : March 24, 1998
INVENTOR(S)    : Tanaka et al.

It is certified that error appears in the above-identified patent and that said Letters Patent is hereby corrected as shown below:

Column 7,
Line 50, delete "the" and insert -- this --.

Column 22,
Line 50, after "means" (first occurrence), insert -- to --.

Column 23,
After line 16 and before line 17, insert -- said second and third mask means being movable relative to one another; and --.

Column 24,
After line 15 and before line 16, insert -- said second and third mask means being movable relative to one another; and --.

Column 25,
After line 4 and before line 5, insert -- said second and third mask means being movable relative to one another; and --
After line 67, insert -- said second and third mask means being movable relative to one another; and --.

Column 26,
Line 14, delete "third" and insert -- second --.

Column 29,
After line 23 and before line 24, insert -- said first and second mask means being movable relative to one another; and --.
Line 53, delete "and".
After line 53 and before line 54, insert -- said first and second mask means being movable relative to one another; and --.

Column 30,
After line 29 and before line 30, insert -- said first and second mask means being movable relative to one another; and --.

Column 31,
After line 26 and before line 27, insert -- said first and second mask means being movable relative to one another; and --.

UNITED STATES PATENT AND TRADEMARK OFFICE
CERTIFICATE OF CORRECTION

PATENT NO.   : 5,732,297
DATED        : March 24, 1998
INVENTOR(S)  : Tanaka et al.

It is certified that error appears in the above-identified patent and that said Letters Patent is hereby corrected as shown below:

Column 33,
After line 13 and before line 14, insert -- said vertical and lateral trimming means being movable relative to one another; --.

Signed and Sealed this

Seventeenth Day of September, 2002

Attest:

Attesting Officer

JAMES E. ROGAN
Director of the United States Patent and Trademark Office